United States Patent
Park et al.

(10) Patent No.: US 12,424,106 B2
(45) Date of Patent: *Sep. 23, 2025

(54) DEVICE AND METHOD FOR MONITORING VESSEL AND HARBOR

(71) Applicant: Seadronix Corp., Ulsan (KR)

(72) Inventors: Byeol Teo Park, Daejeon (KR); Han Keun Kim, Hwaseong-si (KR); Dong Hoon Kim, Daejeon (KR)

(73) Assignee: Seadronix Corp., Ulasan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,637

(22) Filed: Jun. 20, 2024

(65) Prior Publication Data

US 2024/0339037 A1    Oct. 10, 2024

Related U.S. Application Data

(63) Continuation of application No. 17/282,660, filed as application No. PCT/KR2019/013011 on Oct. 4, 2019, now Pat. No. 12,057,018.

(Continued)

(30) Foreign Application Priority Data

Dec. 20, 2018   (KR) .................. 10-2018-0165856

(51) Int. Cl.
*G08G 3/02*   (2006.01)
*G06F 18/21*  (2023.01)
(Continued)

(52) U.S. Cl.
CPC .............. *G08G 3/02* (2013.01); *G06F 18/21* (2023.01); *G06F 18/22* (2023.01); *G06N 3/04* (2013.01);
(Continued)

(58) Field of Classification Search
CPC ...... G06V 10/24; G06V 10/809; G06V 10/82; G06V 10/16; G06V 10/26; G06V 10/30;
(Continued)

(56) References Cited

U.S. PATENT DOCUMENTS

| 8,989,948 B2 | 3/2015 | Huntsberger et al. |
| 10,394,242 B2 | 8/2019 | Kaspi et al. |

(Continued)

FOREIGN PATENT DOCUMENTS

| CN | 10121485 A | 7/2008 |
| CN | 101214851 A * | 7/2008 |

(Continued)

OTHER PUBLICATIONS

Albrecht, Thomas, et al. "Multiple views tracking of maritime targets." 2010 International Conference on Digital Image Computing: Techniques and Applications. IEEE, 2010. (Year: 2010).*

(Continued)

*Primary Examiner* — Vu Le
*Assistant Examiner* — Tracy Mangialaschi
(74) *Attorney, Agent, or Firm* — WTA IP Law P.C.

(57) ABSTRACT

The present invention relates to a method by which a computing means monitors a harbor, and a harbor monitoring method, according to one aspect of the present invention, comprises the steps of: acquiring a harbor image; generating a segmentation image corresponding to the harbor image; generating a display image corresponding to the harbor image and having a first view attribute; generating a conversion segmentation image, which corresponds to the segmentation image and has a second view attribute different from the first view attribute; matching the display image so as to generate a panoramic image; matching the conversion segmentation image so as to generate a matching segmentation image; calculating ship mooring guide information on (Continued)

the basis of the matching segmentation image; and outputting the mooring guide information together with the panoramic image.

16 Claims, 27 Drawing Sheets

Related U.S. Application Data

(60) Provisional application No. 62/741,394, filed on Oct. 4, 2018.

(51) Int. Cl.
| | | |
|---|---|---|
| *G06F 18/22* | (2023.01) | |
| *G06N 3/04* | (2023.01) | |
| *G06N 3/08* | (2023.01) | |
| *G06T 5/70* | (2024.01) | |
| *G06T 7/11* | (2017.01) | |
| *G06T 7/50* | (2017.01) | |
| *G06T 7/70* | (2017.01) | |
| *G06V 10/10* | (2022.01) | |
| *G06V 10/24* | (2022.01) | |
| *G06V 10/26* | (2022.01) | |
| *G06V 10/30* | (2022.01) | |
| *G06V 10/80* | (2022.01) | |
| *G06V 10/82* | (2022.01) | |
| *G06V 20/52* | (2022.01) | |
| *G06V 20/70* | (2022.01) | |
| *H04N 7/18* | (2006.01) | |
| *H04N 23/80* | (2023.01) | |
| *H04N 23/958* | (2023.01) | |

(52) U.S. Cl.
CPC .............. *G06N 3/08* (2013.01); *G06T 5/70* (2024.01); *G06T 7/11* (2017.01); *G06T 7/50* (2017.01); *G06T 7/70* (2017.01); *G06V 10/16* (2022.01); *G06V 10/24* (2022.01); *G06V 10/26* (2022.01); *G06V 10/30* (2022.01); *G06V 10/809* (2022.01); *G06V 10/82* (2022.01); *G06V 20/52* (2022.01); *G06V 20/70* (2022.01); *H04N 7/181* (2013.01); *H04N 23/80* (2023.01); *H04N 23/958* (2023.01); *G06T 2207/20081* (2013.01); *G06T 2207/30232* (2013.01)

(58) Field of Classification Search
CPC .......... G06V 20/52; G06V 20/70; G06T 5/70; G06T 7/70; G06T 7/11; G06T 7/50; G06T 2207/20081; G06T 2207/30232; H04N 5/265; H04N 7/181; H04N 23/80; H04N 23/958; H04N 23/61; H04N 23/90; H04N 23/698; G06N 3/04; G06N 3/08; G06N 3/084; G06F 18/21; G06F 18/22; G08G 3/02; B63B 43/18; B63B 49/00
See application file for complete search history.

(56) References Cited

U.S. PATENT DOCUMENTS

| | | |
|---|---|---|
| 2005/0134440 A1 | 6/2005 | Breed |
| 2009/0271054 A1 | 10/2009 | Dokken |
| 2010/0225761 A1 | 9/2010 | Ishii |
| 2010/0332475 A1 | 12/2010 | Birdwell et al. |
| 2013/0169844 A1 | 7/2013 | Watts et al. |
| 2017/0323154 A1 | 11/2017 | Kollmann et al. |
| 2018/0025644 A1 | 1/2018 | Jeong et al. |
| 2019/0258885 A1 | 8/2019 | Piette et al. |
| 2020/0050202 A1 | 2/2020 | Suresh et al. |
| 2020/0050893 A1 | 2/2020 | Suresh et al. |
| 2020/0074239 A1 | 3/2020 | Park et al. |

FOREIGN PATENT DOCUMENTS

| | | |
|---|---|---|
| EP | 3 041 230 A1 | 7/2016 |
| EP | 3848854 A1 | 7/2021 |
| JP | 2004-175187 A | 6/2004 |
| JP | 2004-178258 A | 6/2004 |
| JP | 2009-122063 A | 6/2009 |
| JP | 2016-212849 A | 12/2016 |
| JP | 2017-215947 A | 12/2017 |
| JP | 2017537484 A | 12/2017 |
| KR | 10-2009-0035589 A | 4/2009 |
| KR | 10-2011-0044101 A | 4/2011 |
| KR | 10-2011-0059206 A | 6/2011 |
| KR | 10-2011-0113608 A | 10/2011 |
| KR | 10-1283759 B1 | 7/2013 |
| KR | 10-1379636 B | 4/2014 |
| KR | 10-2014-0096595 A | 8/2014 |
| KR | 10-1452994 B1 | 10/2014 |
| KR | 10-2014-0126998 A | 11/2014 |
| KR | 10-2014-0133713 A | 11/2014 |
| KR | 10-2015-0125863 A | 11/2015 |
| KR | 10-2016-0001271 A | 1/2016 |
| KR | 10-2016-0062286 A | 6/2016 |
| KR | 10-2016-0129212 A | 11/2016 |
| KR | 10-2017-0031829 A | 3/2017 |
| KR | 10-2017-0065894 A | 6/2017 |
| KR | 10-1771146 B1 | 8/2017 |
| KR | 10-1772916 B1 | 8/2017 |
| KR | 10-2017-0117994 A | 10/2017 |
| KR | 10-2017-0133010 A | 12/2017 |
| KR | 10-1812994 B1 | 12/2017 |
| KR | 10-2018-0010633 A | 1/2018 |
| KR | 10-1805564 B1 | 1/2018 |
| KR | 10-2018-0065411 A | 6/2018 |
| KR | 10-2018-0081979 A | 7/2018 |
| KR | 10-2005559 B1 | 8/2019 |
| WO | WO-2018232376 A1 * | 12/2018 ............ B63B 49/00 |

OTHER PUBLICATIONS

Song, Wenjie et al., "Real-time lane detection and forward collision warning system based on stereo vision," 2017 IEEE Intelligent Vehicles Symposium (IV), IEEE 2017 (2017).
Office Action of U.S. Appl. No. 17/282,660 dated Dec. 21, 2023, 26 pages.
Bovcon, B. et al., "Stereo obstacle detection for unmanned surface vehicles by IMU-assisted semantic segmentation," arXiv preprint arXiv:1802.07956, Feb. 22, 2018, 14 pages.
Daranda, A., "A Neural Network Approach to Predict Marine Traffic," Vilnius University, Institute of Mathematics and Informatics, Lithuania, Technical Report MII-DS-07T-16-9-16, Oct. 2016, 26 pages.
Korean Intellectual Property Office, Grant of Patent, Korean Patent Application No. 10-2018-0165857, Feb. 24, 2021, four pages.
Korean Intellectual Property Office, Grant of Patent, Korean Patent Application No. 10-2020-0003191, Feb. 22, 2021, three pages.
Korean Intellectual Property Office, Grant of Patent, Korean Patent Application No. 10-2020-0058550, Jan. 6, 2021, four pages.
Korean Intellectual Property Office, Grant of Patent, Korean Patent Application No. 10-2018-0165861, Jul. 22, 2020, three pages.
Korean Intellectual Property Office, Grant of Patent, Korean Patent Application No. 10-2018-0165859, Mar. 26, 2020, three pages.
Korean Intellectual Property Office, Grant of Patent, Korean Patent Application No. 10-2019-0122817, Mar. 25, 2020, three pages.
Korean Intellectual Property Office, Grant of Patent, Korean Patent Application No. 10-2018-0165860, Jul. 1, 2019, four pages.
Korean Intellectual Property Office, Grant of Patent, Korean Patent Application No. 10-2018-0165858, May 28, 2019, four pages.
Korean Intellectual Property Office, Notification of Reason for Refusal, Korean Patent Application No. 10-2020-0003191, Nov. 27, 2020, 13 pages.

(56) References Cited

OTHER PUBLICATIONS

Korean Intellectual Property Office, Notification of Reason for Refusal, Korean Patent Application No. 10-2020-0003190, Nov. 27, 2020, 13 pages.
Korean Intellectual Property Office, Notification of Reason for Refusal, Korean Patent Application No. 10-2020-0003173, Nov. 27, 2020, 14 pages.
Korean Intellectual Property Office, Notification of Reason for Refusal, Korean Patent Application No. 10-2020-0058550, Sep. 26, 2020, 10 pages.
Korean Intellectual Property Office, Notification of Reason for Refusal, Korean Patent Application No. 10-2018-0165857, Jul. 31, 2020, 16 pages.
Korean Intellectual Property Office, Notification of Reason for Refusal, Korean Patent Application No. 10-2018-0165861, Feb. 11, 2020, 15 pages.
Korean Intellectual Property Office, Notification of Reason for Refusal, Korean Patent Application No. 10-2018-0165857, Jan. 30, 2020, 18 pages.
Korean Intellectual Property Office, Notification of Reason for Refusal, Korean Patent Application No. 10-2019-0122817, Jan. 3, 2020, 18 pages.
Korean Intellectual Property Office, Notification of Reason for Refusal, Korean Patent Application No. 10-2018-0165860, Mar. 15, 2019, seven pages.
Korean Intellectual Property Office, Notification of Reason for Refusal, Korean Patent Application No. 10-2018-0165858, Feb. 21, 2019, 15 pages.
PCT International Search Report and Written Opinion, PCT Application No. PCT/KR2019/013011, Jan. 17, 2020, 13 pages.
PCT International Search Report and Written Opinion, PCT Application No. PCT/KR2019/009244, Nov. 26, 2019, 16 pages.
PCT International Search Report and Written Opinion, PCT Application No. PCT/KR2019/009231, Nov. 26, 2019, 14 pages.
PCT International Search Report and Written Opinion, PCT Application No. PCT/KR2019/009241, Nov. 25, 2019, 16 pages.
Polvara, R. et al., "Obstacle Avoidance Approaches for Autonomous Navigation of Unmanned Surface Vehicles," The Journal of Navigation, 2018, pp. 241-256, vol. 71.
United States Office Action, U.S. Appl. No. 16/557,859, filed Mar. 9, 2020, eight pages.
PCT International Search Report and Written Opinion, PCT Application No. PCT/KR2021/000036, Apr. 15, 2021, 17 pages.
PCT International Search Report and Written Opinion, PCT Application No. PCT/KR2021/000038, Apr. 26, 2021, 16 pages.
Hu, X. et al. "Deep Learning-Enabled Variational Optimization Method for Image Dehazing in Maritime Intelligent Transportation Systems." Journal of Advanced Transportation, vol. 2021, May 2021, pp. 1-18.
Molina-Molina, J. C. et al. "Autonomous Marine Robot Based on AI Recognition for Permanent Surveillance in Marine Protected Areas." Sensors, vol. 21, No. 8, Apr. 2021, pp. 1-28.
Korean Intellectual Property Office, Office Action, Korean Patent Application No. 10-2021-0034934, Oct. 12, 2022, 17 pages.
Office Action of corresponding KR 10-2019-0122816 issued on May 13, 2024.
Annika Meyer et al. "Deep Semantic Lane Segmentation for Mapless Driving" 2018 IEEE/RSJ International Conference on Intelligent Robots and Systems (IROS), Madrid, Spain, Oct. 1-5, 2018.
Office Action of the corresponding EP Application No. 19 868 246.0 mailed on Nov. 27, 2024.
Notice of Allowance of KR Patent Application No. 10-2019-0122816 issued on Jan. 13, 2025.

\* cited by examiner (a)

(b)

(a)

(b)

(a)

(b)

(a)

(b)

(a)

(b)

DEVICE AND METHOD FOR MONITORING VESSEL AND HARBOR

CROSS-REFERENCE TO RELATED APPLICATIONS

This is a continuation of U.S. patent application Ser. No. 17/282,660, filed on Apr. 2, 2021, which is a 371 application of International PCT Application No. PCT/KR2019/013011, filed on Oct. 4, 2019, which claims priority U.S. Provisional Application No. 62/741,394, filed on Oct. 4, 2018 and claims priority to Republic of Korea Patent Application No. 10-2018-0165856, filed on Dec. 20, 2018, which are incorporated by reference herein in their entirety.

TECHNICAL FIELD

The present invention relates to a device and method for monitoring a vessel and a harbor, and more particularly, to a device and method for monitoring a vessel and harbor based on an image.

BACKGROUND ART

Many accidents have occurred in the sailing of vessels and in berthing or unberthing in harbors, and people's sailing carelessness is known as the main cause of the accidents. Here, the sailing carelessness is mainly caused by not being able to accurately monitor the surroundings of the vessel or the situation in the harbor with the naked eyes. Currently, various types of obstacle sensors are used to compensate for the sailing carelessness, but there are still limitations. For example, in the case of an Electronic Chart Display and Information System (ECDIS), there are limitations due to the inaccuracy of the Global Positioning System (GPS), the update period of the automatic identification system (AIS), and moving objects that are not registered in the AIS. In the case of a radar, there are limitations due to noise and the presence of unsearchable areas. As a result, it is still necessary to visually check for accurate detection of obstacles.

SUMMARY

An object of the present invention is directed to providing a device and method for monitoring a vessel's surroundings and a harbor.

Another object of the present invention is directed to providing a monitoring device and method for checking a vessel's surroundings and a harbor situation upon the vessel's berthing or unberthing and for guiding the vessel to berth or unberth.

Technical problems intended to be solved by the invention are not limited to the aforementioned objects, and other technical objects that are not described herein will be clearly understood by those skilled in the art from the following description and the accompanying According to an aspect of the present invention, a method for monitoring a harbor performed by a computing means may be provided, the method comprising: obtaining, by using a first camera and a second camera capturing images and being installed in the harbor in different directions, a first harbor image including at least one of a vessel or a sea, and a second harbor image whose monitoring area is at least partially different from the first harbor image; generating a first segmentation image corresponding to the first harbor image and a second segmentation image corresponding to the second harbor image by performing image segmentation using an artificial neural network trained to output information related to a type and a distance of an object included in an input image from the input image, wherein the first segmentation image and the second segmentation image include at least one of a first pixel labeled to correspond to the vessel and including information related to a distance of the vessel, or a second pixel labeled to correspond to the sea; generating, by using first viewpoint transformation information calculated by considering at least one of an installation location and posture of the first camera and the second camera, a first display image and a second display image corresponding to the first harbor image and the second harbor image, respectively, and having a first view attribute; generating, by using second viewpoint transformation information being different from the first viewpoint transformation information and being calculated by considering at least one of an installation location and posture of the first camera and the second camera, a first transformed segmentation image and a second transformed segmentation image corresponding to the first segmentation image and the second segmentation image, respectively, and having a second view attribute different from the first view attribute; generating a panoramic image by matching the first display image and the second display image; generating a matched segmentation image by matching the first transformed segmentation image and the second transformed segmentation image; calculating berthing guide information of the vessel based on the matched segmentation image, wherein the berthing guide information includes at least one of a distance to a wharf wall or an approaching speed to the wharf wall of the vessel; and outputting the berthing guide information with the panoramic image.

According to another aspect of the present invention, a method for monitoring a harbor performed by a computing means may be provided, the method comprising: obtaining, by using a first camera and a second camera capturing images and being installed in the harbor in different directions, a first harbor image including at least one of a vessel or a sea, and a second harbor image whose monitoring area is at least partially different from the first harbor image; generating a first segmentation image corresponding to the first harbor image and a second segmentation image corresponding to the second harbor image by performing image segmentation using an artificial neural network trained to output information related to a type and a distance of an object included in an input image from the input image, wherein the first segmentation image and the second segmentation image include at least one of a first pixel labeled to correspond to the vessel and including information related to a distance of the vessel, or a second pixel labeled to correspond to the sea; generating, by using first viewpoint transformation information calculated by considering at least one of an installation location and posture of the first camera and the second camera, a first display image and a second display image corresponding to the first harbor image and the second harbor image, respectively, and having a first view attribute; generating, by using second viewpoint transformation information being different from the first viewpoint transformation information and being calculated by considering at least one of an installation location and posture of the first camera and the second camera, a first transformed image and a second transformed image corresponding to the first harbor image and the second harbor image, respectively, and having a second view attribute different from the first view attribute; generating, by using the second viewpoint transformation information, a first transformed segmentation image and a second transformed segmentation image corresponding to the first segmentation image and the second segmentation image, respectively, and having the second view attribute; generating a panoramic image by matching the first display image and the second display image based on matching information extracted from the first display image and the second display image; generating a matched segmentation image by matching the first transformed segmentation image and the second transformed segmentation image based on matching information extracted from the first transformed image and the second transformed image; calculating a distance to a wharf wall of the vessel based on a pixel being included in the matched segmentation image and corresponding to a point where the vessel contacts the sea; and calculating the approaching speed to the wharf wall based on the distance to the wharf wall of the vessel.

According to yet another aspect of the present invention, a method for monitoring around a vessel performed by a computing means may be provided, the method comprising: obtaining, by using a first camera and a second camera capturing images and being installed on a vessel in different directions, a first maritime image including at least one of an obstacle around a vessel or a sea, and a second maritime image whose monitoring area is at least partially different from the first maritime image; generating a first segmentation image corresponding to the first maritime image and a second segmentation image corresponding to the second maritime image by performing image segmentation using an artificial neural network trained to output information related to a type and a distance of an object included in an input image from the input image, wherein the first segmentation image and the second segmentation image include at least one of a first pixel labeled to correspond to the obstacle and including information related to a distance of the obstacle, or a second pixel labeled to correspond to the sea; generating, by using first viewpoint transformation information calculated by considering at least one of an installation location and posture of the first camera and the second camera, a first display image and a second display image corresponding to the first maritime image and the second maritime image, respectively, and having a first view attribute; generating, by using second viewpoint transformation information being different from the first viewpoint transformation information and being calculated by considering at least one of an installation location and posture of the first camera and the second camera, a first transformed segmentation image and a second transformed segmentation image corresponding to the first segmentation image and the second segmentation image, respectively, and having a second view attribute different from the first view attribute; generating a panoramic image by matching the first display image and the second display image; generating a matched segmentation image by matching the first transformed segmentation image and the second transformed segmentation image; and calculating sailing guide information of the vessel based on the matched segmentation image, wherein the sailing guide information includes at least one of a distance to the obstacle or an approaching speed to the obstacle of the vessel.

According to yet another aspect of the present invention, a method for monitoring a harbor performed by a computing means may be provided, the method comprising: obtaining a harbor image having a first view and including a wharf wall and a vessel berthing to the wharf wall; generating, by using first viewpoint transformation information transforming the first view to a second view, a display image having the second view from the harbor image having the first view; generating, by using an artificial neural network trained to output information related to a type of an object included in an input image from the input image, a segmentation image having the first view from the harbor image having the first view, wherein an object class is assigned to each pixel in the harbor image; generating, by using second viewpoint transformation information transforming the first view to a third view different from the second view, a transformed segmentation image having the third view from the segmentation image having the first view; calculating a distance to the wharf wall and an approaching speed to the wharf wall of the vessel based on the transformed segmentation image; and outputting the distance and the approaching speed with the display image.

Technical solutions of the present invention are not limited to the aforementioned solutions, and other solutions not described herein will be apparently understood by those skilled in the art from the following description and the accompanying drawings.

According to the present invention, it is possible to monitor a vessel's surroundings and a harbor using the monitoring device and method.

According to the present invention, it is also possible to check a vessel's surroundings and a harbor situation upon the vessel's berthing or unberthing and guide the vessel to berth or unberth using the monitoring device and method.

Advantageous effects of the present invention are not limited to the aforementioned effects, and other advantageous effects that are not described herein will be clearly understood by those skilled in the art from the following description and the accompanying drawings.

DETAILED DESCRIPTION

Figure 1:
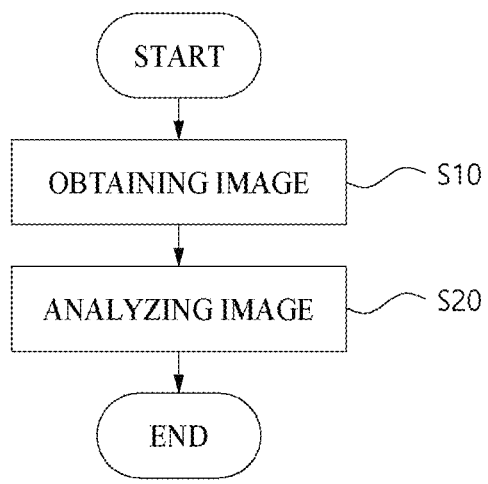
FIG. 1 is a diagram related to image-based monitoring according to an embodiment.

Embodiments described in this specification are intended to clearly explain the spirit of the invention to those skilled in the art. Therefore, the present invention is not limited by the embodiments, and the scope of the present invention should be interpreted as encompassing modifications and variations without departing from the spirit of the invention.

Terms used in this specification are selected from among general terms, which are currently widely used, in consideration of functions in the present invention and may have meanings varying depending on intentions of those skilled in the art, customs in the field of art, the emergence of new technologies, or the like. However, when a specific term is defined and used in a specific sense, the meaning of the term will be described separately. Accordingly, terms used in this specification should be interpreted based on the actual meanings and the whole context throughout the specification rather than based on the names.

The accompanying drawings are intended to easily explain the present invention, and shapes shown in the drawings may be exaggerated as necessary in order to aid in understanding the present invention. Therefore, the present invention is not limited by the drawings.

When it is determined that detailed descriptions of well-known elements or functions related to the present invention may obscure the subject matter of the present invention, detailed descriptions thereof will be omitted herein as necessary.

According to an aspect of the present invention, a method for monitoring a harbor performed by a computing means may be provided, the method comprising: obtaining, by using a first camera and a second camera capturing images and being installed in the harbor in different directions, a first harbor image including at least one of a vessel or a sea, and a second harbor image whose monitoring area is at least partially different from the first harbor image; generating a first segmentation image corresponding to the first harbor image and a second segmentation image corresponding to the second harbor image by performing image segmentation using an artificial neural network trained to output information related to a type and a distance of an object included in an input image from the input image, wherein the first segmentation image and the second segmentation image include at least one of a first pixel labeled to correspond to the vessel and including information related to a distance of the vessel, or a second pixel labeled to correspond to the sea; generating, by using first viewpoint transformation informa-tion calculated by considering at least one of an installation location and posture of the first camera and the second camera, a first display image and a second display image corresponding to the first harbor image and the second harbor image, respectively, and having a first view attribute; generating, by using second viewpoint transformation information being different from the first viewpoint transformation information and being calculated by considering at least one of an installation location and posture of the first camera and the second camera, a first transformed segmentation image and a second transformed segmentation image corresponding to the first segmentation image and the second segmentation image, respectively, and having a second view attribute different from the first view attribute; generating a panoramic image by matching the first display image and the second display image; generating a matched segmentation image by matching the first transformed segmentation image and the second transformed segmentation image; calculating berthing guide information of the vessel based on the matched segmentation image, wherein the berthing guide information includes at least one of a distance to a wharf wall or an approaching speed to the wharf wall of the vessel; and outputting the berthing guide information with the panoramic image.

Herein, the method may further comprise generating, by using the second viewpoint transformation information, a first transformed image and a second transformed image corresponding to the first harbor image and the second harbor image, respectively, and having the second view attribute, wherein in the generating the panoramic image, generating the panoramic image by matching the first display image and the second display image based on first matching information extracted from the first display image and the second display image, and wherein in the generating the matched segmentation image, generating the matched segmentation image by matching the first transformed segmentation image and the second transformed segmentation image based on second matching information extracted from the first transformed image and the second transformed image.

Herein, the first matching information may be extracted from a land area included in the first display image and the second display image, and the second matching information may be extracted from a land area included in the first transformed image and the second transformed image.

Herein, the calculating the berthing guide information may comprise: calculating the distance to the wharf wall of the vessel based on the matched segmentation image; and calculating the approaching speed to the wharf wall based on the distance to the wharf wall of the vessel.

Herein, in the calculating the distance to the wharf wall, calculating the distance to the wharf wall based on a pixel being included in the matched segmentation image and corresponding to a point where the vessel contacts the sea.

Herein, the vessel may include a target vessel berthing into a berth and a moored vessel mooring at a neighboring berth, and the berthing guide information may include at least one of a distance between the target vessel and the moored vessel or a relative speed of the target vessel with the moored vessel.

Herein, the vessel may include a target vessel berthing into a berth and a tug to assist the berthing of the target vessel, at least one of the first segmentation image or the second segmentation image may include a third pixel labeled to correspond to the target vessel and a fourth pixel labeled to correspond to the tug, and in the calculating the berthing guide information, calculating the berthing guide information based on the third pixel.

Herein, the first harbor image and the second harbor image may be images that has been pre-processed to remove noise included in images captured by the first camera and the second camera.

Herein, the outputting may be transmitting the panoramic image and the berthing guide information to a terminal to display the berthing guide information with the panoramic image using the terminal remotely located, or displaying the berthing guide information with the panoramic image.

Herein, the second viewpoint transformation information may be calculated considering a height of a sea level.

Herein, the artificial neural network may be trained by considering a difference between an output image outputted by inputting a training image to the artificial neural network and a labeling image reflecting information related to a type and a distance of an object included in the training image.

Herein, the second view may be a view overlooking a sea level from a direction perpendicular to the sea level.

Herein, the method may further comprise detecting whether an intruder has occurred based on whether a person is included in the first harbor image and a timepoint when the first harbor image is captured.

Herein, the method may further comprise: determining a risk of collision based on the berthing guide information; and outputting a collision risk to a user based on the risk of collision.

According to another aspect of the present invention, a method for monitoring a harbor performed by a computing means may be provided, the method comprising: obtaining, by using a first camera and a second camera capturing images and being installed in the harbor in different directions, a first harbor image including at least one of a vessel or a sea, and a second harbor image whose monitoring area is at least partially different from the first harbor image; generating a first segmentation image corresponding to the first harbor image and a second segmentation image corresponding to the second harbor image by performing image segmentation using an artificial neural network trained to output information related to a type and a distance of an object included in an input image from the input image, wherein the first segmentation image and the second segmentation image include at least one of a first pixel labeled to correspond to the vessel and including information related to a distance of the vessel, or a second pixel labeled to correspond to the sea; generating, by using first viewpoint transformation information calculated by considering at least one of an installation location and posture of the first camera and the second camera, a first display image and a second display image corresponding to the first harbor image and the second harbor image, respectively, and having a first view attribute; generating, by using second viewpoint transformation information being different from the first viewpoint transformation information and being calculated by considering at least one of an installation location and posture of the first camera and the second camera, a first transformed image and a second transformed image corresponding to the first harbor image and the second harbor image, respectively, and having a second view attribute different from the first view attribute; generating, by using the second viewpoint transformation information, a first transformed segmentation image and a second transformed segmentation image corresponding to the first segmentation image and the second segmentation image, respectively, and having the second view attribute; generating a panoramic image by matching the first display image and the second display image based on matching information extracted from the first display image and the second display image; generating a matched segmentation image by matching the first transformed segmentation image and the second transformed segmentation image based on matching information extracted from the first transformed image and the second transformed image; calculating a distance to a wharf wall of the vessel based on a pixel being included in the matched segmentation image and corresponding to a point where the vessel contacts the sea; and calculating the approaching speed to the wharf wall based on the distance to the wharf wall of the vessel.

According to yet another aspect of the present invention, a method for monitoring around a vessel performed by a computing means may be provided, the method comprising: obtaining, by using a first camera and a second camera capturing images and being installed on a vessel in different directions, a first maritime image including at least one of an obstacle around a vessel or a sea, and a second maritime image whose monitoring area is at least partially different from the first maritime image; generating a first segmentation image corresponding to the first maritime image and a second segmentation image corresponding to the second maritime image by performing image segmentation using an artificial neural network trained to output information related to a type and a distance of an object included in an input image from the input image, wherein the first segmentation image and the second segmentation image include at least one of a first pixel labeled to correspond to the obstacle and including information related to a distance of the obstacle, or a second pixel labeled to correspond to the sea; generating, by using first viewpoint transformation information calculated by considering at least one of an installation location and posture of the first camera and the second camera, a first display image and a second display image corresponding to the first maritime image and the second maritime image, respectively, and having a first view attribute; generating, by using second viewpoint transformation information being different from the first viewpoint transformation information and being calculated by considering at least one of an installation location and posture of the first camera and the second camera, a first transformed segmentation image and a second transformed segmentation image corresponding to the first segmentation image and the second segmentation image, respectively, and having a second view attribute different from the first view attribute; generating a panoramic image by matching the first display image and the second display image; generating a matched segmentation image by matching the first transformed segmentation image and the second transformed segmentation image; and calculating sailing guide information of the vessel based on the matched segmentation image, wherein the sailing guide information includes at least one of a distance to the obstacle or an approaching speed to the obstacle of the vessel.

According to yet another aspect of the present invention, a method for monitoring a harbor performed by a computing means may be provided, the method comprising: obtaining a harbor image having a first view and including a wharf wall and a vessel berthing to the wharf wall; generating, by using first viewpoint transformation information transforming the first view to a second view, a display image having the second view from the harbor image having the first view; generating, by using an artificial neural network trained to output information related to a type of an object included in an input image from the input image, a segmentation image having the first view from the harbor image having the first view, wherein an object class is assigned to each pixel in the harbor image; generating, by using second viewpoint transformation information transforming the first view to a third view different from the second view, a transformed segmentation image having the third view from the segmentation image having the first view; calculating a distance to the wharf wall and an approaching speed to the wharf wall of the vessel based on the transformed segmentation image; and outputting the distance and the approaching speed with the display image.

Herein, the second view may be a view in which the wharf wall included in the display image is located along a horizontal direction in the display image, and the third view may be a view overlooking a sea level from a direction perpendicular to the sea level.

Herein, the distance may include a first distance and a second distance which are distances to the wharf wall from a first point and a second point, respectively, corresponding to both ends of the vessel contacting with the sea level.

Herein, the outputting may be transmitting the distance, the approaching speed and the display image to a terminal to display the distance and the approaching speed with the display image using the terminal remotely located, or displaying the distance and the approaching speed with the display image.

Herein, the harbor image may include a first harbor image and a second harbor image whose monitoring area is at least partially overlapped with the first harbor image, wherein the segmentation image may include a first segmentation image and a second segmentation image corresponding to the first harbor image and the second harbor image, respectively, wherein the display image may be generated, by using first matching information extracted from a first display image and a second display image corresponding to the first harbor image and the second harbor image, respectively, by matching the first display image and the second display image, and wherein the transformed segmentation image may be generated, by using second matching information extracted from a first transformed image and a second transformed image having the third view and being generated, respectively, from the first harbor image and the second harbor image having the first view and different from the first matching information, by matching a first transformed segmentation image corresponding to the first segmentation image and a second transformed segmentation image corresponding to the second segmentation image.

According to another aspect of the present invention, there is provided a monitoring method using a plurality of sensor modules installed at different locations to monitor a vessel's surroundings upon the vessel's berthing or unberthing, the monitoring method including acquiring images of the vessel's surroundings from a first camera and a second camera included in each of the plurality of sensor modules, wherein the first camera and the second camera are positioned in one direction to generate a first image and a second image, respectively, and the first camera has a larger field of view and a shallower depth of field than the second camera; acquiring location information related to the sensor module; acquiring orientation information related to the sensor module; generating a first top view image obtained by changing a viewpoint of the first image using the location information and the orientation information; generating a second top view image obtained by changing a viewpoint of the second image using the location information and the orientation information; and generating a top view matching image by matching the first top view image and the second top view image generated from the same sensor module.

Herein, the generating the top view matching image may include generating the top view matching image using the second top view image for an area overlapping the second top view image in an area of the first top view image included in the top view matching image and generating the top view matching image using the first top view image for an area not overlapping the second top view image in the area of the first top view image included in the top view matching image.

Herein, the monitoring method may further include generating a panorama image by matching a plurality of the top view matching images generated by different sensor modules, wherein some of the plurality of top view matching images have an overlapping area and the matching of the plurality of top view matching images is performed based on the location information and the orientation information.

Herein, the monitoring method may further include calculating monitoring information of the vessel based on the panorama image, wherein the monitoring information includes at least one selected from the group of information on a distance from the vessel to a harbor, information on an angle of the vessel to a harbor, information on a velocity of the vessel moving from a harbor, and information on an obstacle included in the panorama image; and outputting the monitoring information.

Herein, the information on the distance from the vessel to the harbor may be calculated considering at least one of the distance between the harbor and the bow of the vessel or the distance between the harbor and the stern of the vessel.

Herein, the information on the angle of the vessel to the harbor may be calculated considering at least one of an angle between a first virtual line connecting the bow and stern of the vessel and a second virtual line where the harbor and a water surface are in contact or an angle between the first virtual line and a third virtual line connecting one point of the harbor and one point of the vessel.

Herein, the information on the velocity of the vessel moving from the harbor may be calculated considering at least one of the velocity of the bow of the vessel moving from the harbor or the velocity of the stern of the vessel moving from the harbor.

Herein, the monitoring method may further include at least one of pre-processing the first image to remove noise included in the first image or pre-processing the second image to remove noise included in the second image.

Herein, the noise may include at least one selected from the group of fog, rain, water droplets, sea fog, fine dust, direct sunlight, and salt.

Herein, the monitoring method may further include at least one of acquiring a first comparison target image including a first target fixture from the first camera or acquiring a second comparison target image including a second target fixture from the second camera, wherein the acquiring of the orientation information may include at least one of comparing a location of the first target fixture in the first comparison target image and a location of the first target fixture in the first image and comparing a location of the second target fixture in the second comparison target image and a location of the second target fixture in the second image.

Herein, the monitoring method may further include notifying a user when the first image does not include the first target fixture or when the second image does not include the second target fixture.

According to still another aspect of the present invention, there is provided a monitoring method using a plurality of sensor modules installed at different locations to monitor a vessel's surroundings upon the vessel's berthing or unberthing, the monitoring method including acquiring images of the vessel's surroundings from a first camera and a second camera included in each of the plurality of sensor modules, wherein the first camera and the second camera are positioned in different directions to generate a first image and a second image, respectively; acquiring location information related to the image generation module; acquiring orientation information related to the image generation module; generating a first top view image obtained by changing a viewpoint of the first image using the location information and the orientation information; generating a second top view image obtained by changing a viewpoint of the second image using the location information and the orientation information; generating a top view matching image by matching the first top view image and the second top view image generated from the same sensor module; and generating a panorama image by matching a plurality of the top view matching images generated by different sensor modules wherein some of the plurality of top view matching images have an overlapping area and the matching of the plurality of top view matching images is performed based on the location information and the orientation information.

According to still another aspect of the present invention, there is provided a monitoring device including a plurality of sensor modules installed at different locations to monitor a vessel's surroundings upon the vessel's berthing or unberthing, each sensor module including a first camera and a second camera positioned in one direction to capture the vessel's surroundings, wherein the first camera and the second camera generate a first image and a second image, respectively, and the first camera has a larger field of view and a shallower depth of field than the second camera; a location measurement unit configured to acquire location information related to the sensor module; an orientation measurement unit configured to acquire orientation information related to the sensor module; a control unit configured to generate a first top view image obtained by changing a viewpoint of the first image and a second top view image obtained by changing a viewpoint of the second image using the location information and the orientation information and configured to generate a top view matching image by matching the first top view image and the second top view image; and a communication unit configured to transmit the top view matching image externally from the sensor module.

Herein, the control unit may generate the top view matching image using the second top view image for an area overlapping the second top view image in an area of the first top view image included in the top view matching image and generate the top view matching image using the first top view image for an area not overlapping the second top view image in the area of the first top view image included in the top view matching image.

Herein, the sensor module may further include a casing having a cavity formed therein to include at least one selected from the group of the first camera, the second camera, the location measurement unit, the orientation measurement unit, the control unit, and the communication unit in order to protect the sensor module from salt.

Herein, the casing may further include a casing including a wiper installed on a front side of at least one of the first camera or the second camera to physically remove foreign substances.

Herein, the monitoring device may further include a control module configured to generate a panorama image by matching a plurality of the top view matching images acquired from the communication unit, wherein the control module may match the plurality of top view matching images generated by the different sensor modules to generate the panorama image, and wherein some of the plurality of top view matching images have an overlapping area and the matching of the plurality of top view matching images may be performed based on the location information and the orientation information.

Herein, the monitoring device may further include an output module configured to calculate monitoring information of the vessel on the basis of the panorama image, wherein the output module includes a display configured to output the calculated monitoring information, and the monitoring information may include at least one selected from the group of information on a distance from the vessel to a harbor, information on an angle of the vessel to a harbor, information on a velocity of the vessel moving from a harbor, and information on an obstacle included in the panorama image.

Herein, the installation location of the sensor module may be one of the vessel, the harbor at which the vessel is to berth or unberth, and a tugboat that supports the berthing or unberthing of the vessel.

According to still another aspect of the present invention, there is provided a monitoring device including a plurality of sensor modules installed at different locations to monitor a vessel's surroundings upon the vessel's berthing or unberthing, each sensor module including a first camera and a second camera positioned in different directions to capture the vessel's surroundings, wherein the first camera and the second camera generate a first image and a second image, respectively; a location measurement unit configured to acquire location information related to the sensor module; an orientation measurement unit configured to acquire orientation information related to the sensor module; a control unit configured to generate a first top view image obtained by changing a viewpoint of the first image and a second top view image obtained by changing a viewpoint of the second image using the location information and the orientation information and configured to generate a top view matching image by matching the first top view image and the second top view image; a communication unit configured to transmit the top view matching image externally from the sensor module; and a control module configured to match a plurality of the top view matching images acquired from the communication unit to generate a panorama image, wherein the control module generates the panorama image by matching a plurality of the top view matching images generated by different sensor modules, and wherein some of the plurality of top view matching images have an overlapping area and the matching of the plurality of top view matching images is performed based on the location information and the orientation information.

A device and method for monitoring a vessel and a harbor based on an image will be described below.

Herein, monitoring should be interpreted as broadly as possible to include not only detecting targets such as a certain area or specific object using various sensors and providing the detection result to a user but also providing additional information through calculations based on the detection result.

Image-based monitoring may mean checking or recognizing a surrounding situation based on an image. For example, image-based monitoring may mean acquiring information regarding surrounding environments, for example, by acquiring images of a vessel's surroundings to recognize other vessels or obstacles from the images while the vessel sails or recognizing other vessels or obstacles, checking the situation of a harbor, checking whether the vessel can approach a berth, calculating a distance to a quay wall and a velocity, or checking whether there is an obstacle on a sailing route upon the vessel's berthing or unberthing. Herein, image-based monitoring will be mainly described in vessels and a harbor, but the present invention is not limited thereto and may be applied to a case of driving a vehicle or operating an aircraft.

An image-based monitoring device is a device that performs image-based monitoring, and the configuration of the device will be described in detail below.

FIG. 1 is a diagram related to image-based monitoring according to an embodiment. Referring to FIG. 1, the image-based monitoring may include an image obtaining step S10 and an image analysis step S20.

The image obtaining step S10 may refer to a step in which an image-based monitoring device acquires an image. Here, the image may have various types, such as an RGB image, an IR image, a depth image, a lidar image, and a radar image, and the present invention is not limited thereto. Also, not only two-dimensional (2D) images but also three-dimensional (3D) images are possible.

The image analysis step S20 may refer to a step of acquiring an analysis result based on an image. As an example, the image analysis step S20 may include obtaining a result of analyzing information needed for monitoring on the basis of an input image. Alternatively, the image analysis step S20 may refer to a step of analyzing the characteristics of an object included in the image. Alternatively, the image analysis step S20 may include a step of determining a situation indicated by the image.

The image obtaining step S10 and the image analysis step S20 will be described in detail below. Hereinafter, information acquired through the image obtaining step S10 or the image analysis step S20 is referred to as monitoring information.

Figure 2:
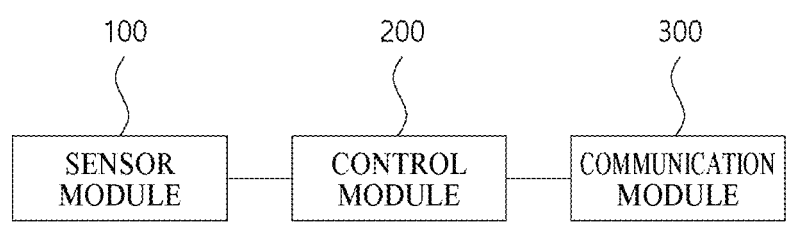
FIG. 2 is a diagram related to an image-based monitoring device according to an embodiment.

FIG. 2 is a diagram related to an image-based monitoring device according to an embodiment. Referring to FIG. 2, an image-based monitoring device 10 may include a sensor module 100, a control module 200, and a communication module 300.

The sensor module 100 may sense information on a vessel or a vessel's surroundings and a harbor. The sensor module 100 may include an automatic identification system (AIS), an image generation unit, a location measurement unit, an orientation measurement unit, a casing, and the like.

The image generation unit may generate an image. The image generation unit may include a camera, a lidar, a radar, an ultrasonic detector, and the like. Examples of the camera include a monocular camera, a binocular camera, a visible light camera, an IR camera, and a depth camera, but not limited thereto.

The location measurement unit may measure the location of the sensor module or the location of an element, such as the image generation unit, included in the sensor module. As an example, the location measurement unit may be a Global Positioning System (GPS) unit. In particular, a real-time kinematic GPS may be used to improve the accuracy of location measurement.

The location measurement unit may acquire location information at predetermined time intervals. Here, the time interval may vary depending on the installation location of the sensor module. For example, when the sensor module is installed in a moving object such as a vessel, the location measurement unit may acquire location information at short time intervals. On the other hand, when the sensor module is installed in a fixture such as a harbor, the location measurement unit may acquire location information at long time intervals. The time interval at which the location measurement unit acquires the location information may be changed.

The orientation measurement unit may measure the orientation of the sensor module or the orientation of an element, such as the image generation unit, included in the sensor module. As an example, the orientation measurement unit may be an inertial measurement unit (IMU).

The orientation measurement unit may acquire orientation information at predetermined time intervals. Here, the time interval may vary depending on the installation location of the sensor module. For example, when the sensor module is installed in a moving object such as a vessel, the orientation measurement unit may acquire orientation information at short time intervals. On the other hand, when the sensor module is installed in a fixture such as a harbor, the orientation measurement unit may acquire orientation information at long time intervals. The time interval at which the orientation measurement unit acquires the orientation information may be changed.

The casing may protect sensor modules such as an image generation unit, a location measurement unit, and an orientation measurement unit.

At least one selected from the group of the image generation unit, the location measurement unit, and the orientation measurement unit may be present inside the casing. The casing can prevent an apparatus, such as an image generation unit therein, from being corroded by salt water. Alternatively, the casing may protect the apparatus therein by preventing or mitigating an impact applied to the apparatus.

A cavity may be formed inside the casing to encompass an image generation unit or the like. For example, the casing may have a rectangular parallelepiped shape with an empty interior, but not limited thereto. The casing may be provided in various shapes in which an image generation unit or the like may be positioned.

When the image generation unit is positioned inside the casing, an opening may be formed in one area of the casing or one area of the casing may be formed of a transparent material such as glass to secure the sight of the image generation unit. The image generation unit may capture images of a vessel's surroundings and a harbor through the opening or the transparent area.

The casing may be made of a robust material to protect the image generation unit or the like from external impact. Alternatively, the casing may be formed of a material such as a seawater-resistant alloy to prevent corrosion due to salt.

The casing may include an apparatus for removing foreign substances from the image generation unit. As an example, foreign substances adhering to the surface of the image generation unit may be physically removed through a wiper included in the casing. Here, the wiper may be provided in a linear shape or a plate shape having the same, or a similar, curvature as a surface from which foreign substances are to be removed so as to be in close contact with the surface. As another example, foreign substances may be removed by applying water or washer fluid through a liquid spray included in the casing or may be physically removed using the wiper after the application.

The foreign-substance removal apparatus may be manually activated but can also be automatically activated. For example, the foreign-substance removal apparatus may be operated at predetermined time intervals. Alternatively, the foreign-substance removal apparatus may be operated using a sensor that detects whether a foreign substance has adhered to the image generation unit. Alternatively, after determining whether a foreign substance has been captured in an image captured by the image generation unit, the foreign-substance removal apparatus may be operated when it is determined that the foreign substance is in the image. Here, whether the foreign substance has been captured in the image may be determined through an artificial neural network.

One sensor module 100 may include a plurality of identical apparatuses including two or more identical cameras.

The control module 200 may perform image analysis. Also, an operation of receiving various kinds of data through the sensor module 100, an operation of outputting various outputs through an output module, an operation of storing various kinds of data in a memory or acquiring various kinds of data from a memory, and the like may be performed by control of the control module 200. Various kinds of operations or steps disclosed in embodiments of the present disclosure may be interpreted as being performed by the control module 200 or performed by control of the control module 200 unless otherwise stated.

Examples of the control module 200 may include a central processing unit (CPU), a graphics processing unit (GPU), a digital signal processor (DSP), a state machine, an application-specific integrated circuit (ASIC), a radio-frequency integrated circuit (RFIC), and a combination thereof.

The communication module 300 may transmit information externally from the device 10 or receive information from an external. The communication module 300 may perform wired or wireless communication. The communication module 300 may perform bidirectional or unidirectional communication. For example, the device 10 may deliver information to an external output device through the communication module 300 to output a control result of the control module 200 through the external output device.

The sensor module 100, the control module 200, and the communication module 300 may each include a control unit. The control unit may perform processing and computation on various kinds of information in a corresponding module and may control other elements included in the module. The control unit may be provided in the form of an electronic circuit that physically processes electric signals. The module may physically include only a single control unit but may alternatively include a plurality of control units. As an example, the control unit may be one or a plurality of processors installed in one computing means. As another example, the control unit may be provided as processors installed in physically separated servers and terminals to collaborate through communication. Examples of the control unit may include a CPU, a GPU, a DSP, a state machine, an ASIC, an RFIC, and a combination thereof.

The sensor module 100, the control module 200, and the communication module 300 may each include a communication unit. The modules may transmit and receive information through the communication units. For example, the sensor module 100 may transmit information acquired externally through the communication unit, and the control module 200 may receive information transmitted by the sensor module 100 through the communication unit. The communication unit may perform wired or wireless communication. The communication unit may perform bidirectional or unidirectional communication.

The sensor module 100, the control module 200, and the communication module 300 may each include a memory. The memory may store various processing programs, parameters for processing programs, data obtained through such processing, and the like. For example, the memory may store data necessary for learning and/or inference, an artificial neural network being trained or already trained, and the like. The memory may be implemented as a non-volatile semiconductor memory, a hard disk, a flash memory, a random-access memory (RAM), a read-only memory (ROM), an electrically erasable programmable read-only memory (EEPROM), or other tangible non-volatile recording media.

The image-based monitoring device may include a plurality of identical modules such as including two or more sensor modules. For example, one device may include two sensor modules, and each sensor module may include two cameras.

Figure 3:
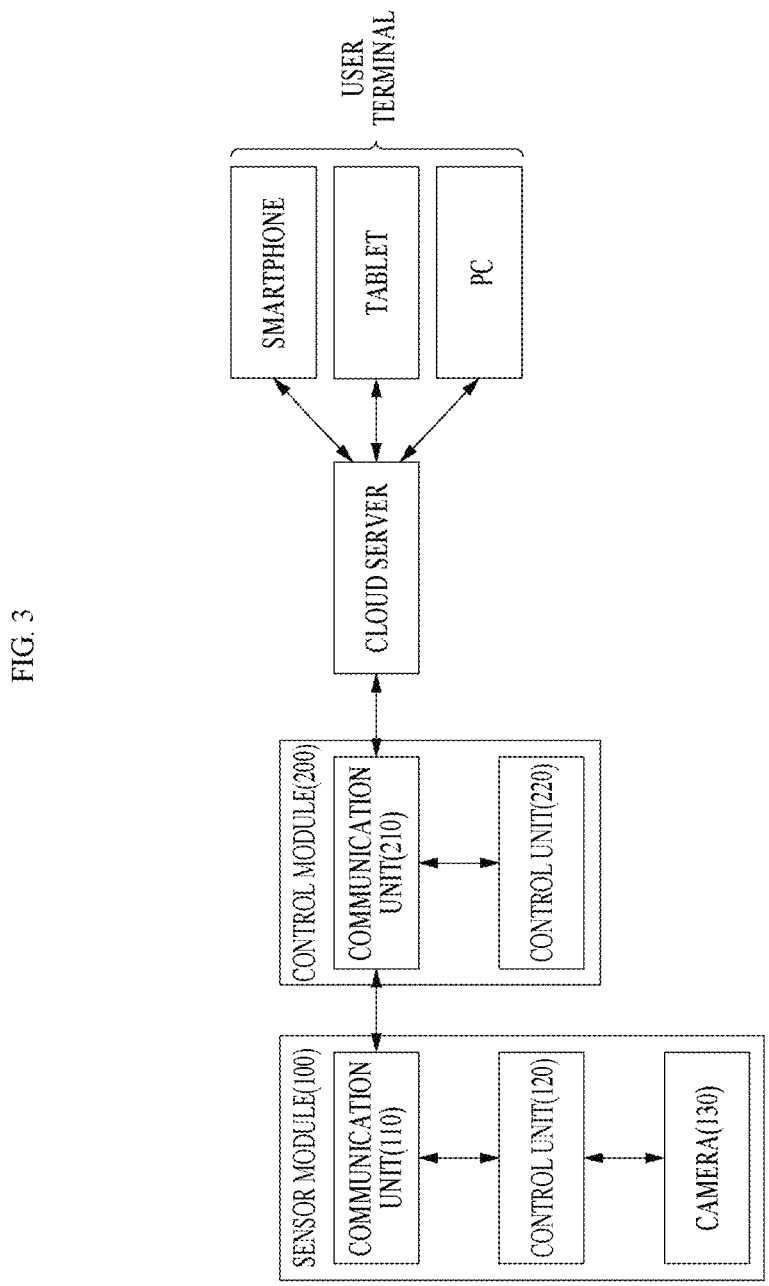
FIGS. 3 and 4 are diagrams related to an example of an image-based monitoring device according to an embodiment.
Figure 4:
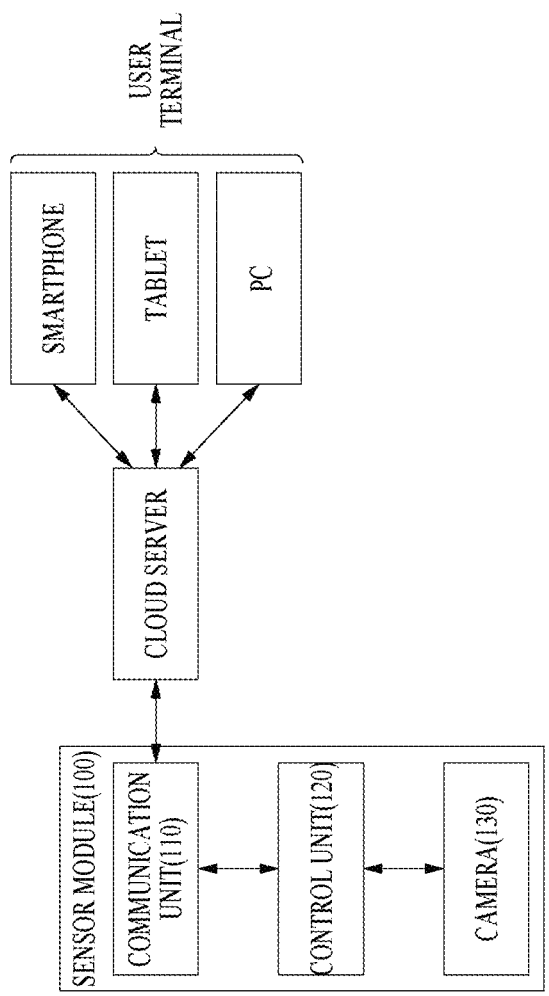

FIGS. 3 and 4 are diagrams related to an example of an image-based monitoring device according to an embodiment.

Referring to FIG. 3, the image-based monitoring device may include a sensor module 100 and a control module 200. The sensor module 100 may generate an image through a camera 130 and transmit an image to the control module 200 through a communication unit 110. Also, a control unit 120 of the sensor module 100 may change a viewpoint of an image by performing viewpoint transformation, which will be described below. The control module 200 may receive an image from the sensor module 100 through the communication unit 210 and may perform image analysis such as location/movement information estimation and image matching, which will be described below, through a control unit 220. Also, the control module 200 may transmit an analysis result such as a matched image and location/movement information to a cloud server through the communication unit 210. The cloud server may transmit the analysis result received from the control module 200 to a user terminal, such as a smartphone, a tablet, and a personal computer (PC), or may receive an instruction from a user terminal.

Referring to FIG. 4, the image-based monitoring device may include a sensor module 100. The sensor module 100 may generate an image through a camera 130 and transmit an image to a cloud server through a communication unit 110. Also, a control unit 120 of the sensor module 100 may change the viewpoint of an image by performing viewpoint transformation, which will be described below. The cloud server may receive an image from the sensor module 100 and perform image analysis such as location/movement information estimation and image matching, which will be described below. Also, the cloud server may transmit a result of the image analysis to a user terminal, such as a smartphone, a tablet, and a PC, or may receive an instruction from a user terminal.

The devices shown in FIGS. 2 to 4 are for illustrative purposes only, and the configuration of the device is not limited thereto.

As an example, the device may include an output module. The output module may output a result of computation performed by the control module, or the like. For example, the output module may output an analysis result. The output module may be, for example, a display, a speaker, a signal output circuit, or the like, but not limited thereto. In this case, information may be output through the output module rather than being delivered to an external output device, such as a user terminal, so that the external output device outputs the information.

As another example, the device may include no sensor modules. In this case, the control module may perform an image-based monitoring operation, for example, by receiving information from an external sensor device and performing image analysis. For example, the control module may receive information from an AIS, a camera, a lidar, a radar, or the like installed in a vessel or a harbor and perform image analysis.

Also, the step performed by each element shown in FIGS. 2 to 4 is not necessarily performed by the corresponding element and may be performed by other elements. For example, in FIG. 3 above, it has been described that the control unit 120 of the sensor module 100 performs viewpoint transformation, but the control unit 220 of the control module 200 or the cloud server may perform viewpoint transformation.

An image-based device and method for monitoring a vessel and a harbor will be described in more detail below.

Image acquisition for image-based monitoring may be performed through a sensor module. For example, an image may be acquired through an image generation unit included in the sensor module. Alternatively, as described above, an image may be acquired from an external sensor device. Generally, images for vessel and harbor monitoring may include the sea, vessels, buoys, obstacles, topographic features, harbors, the sky, buildings, and the like. The following description mainly relates to perform monitoring by analyzing an image acquired through a visible light camera, but not limited thereto.

Figure 5:
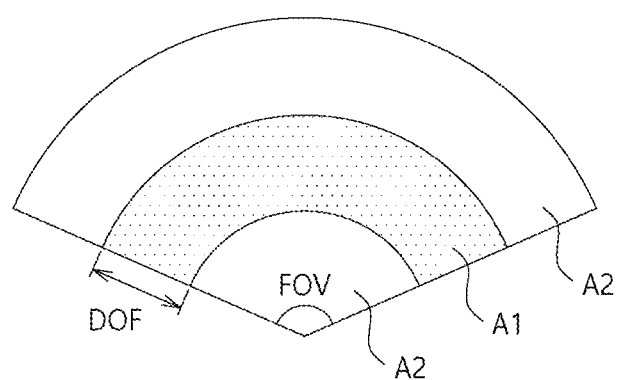
FIG. 5 is a diagram related to a field of view and a depth of field according to an embodiment.

A field of view and a depth of field may vary depending on the image generation unit. FIG. 5 is a diagram related to a field of view and a depth of field according to an embodiment. Referring to FIGS. 5, a field of view (FOV) may refer to a range covered by the image up, down, to the right and left and is generally expressed as an angle (degree). A larger FOV may mean generating an image including an area with a larger transverse width or generating an image including an area with a larger longitudinal width. A depth of field (DOF) may refer to a distance range recognized as being in focus, and a deep DOF may mean that the distance range recognized as being in focus is large. Referring to FIG. 5, depending on the DOF, the image may include an area A1 recognized as being in focus and the other area A2. Hereinafter, an area included in an image is referred to as an imaging area A1+A2, and the area recognized as being in focus is referred to as an effective area A1. Since image analysis and monitoring may be performed based on the effective area or based on a portion or the entirety of the imaging area, an area used to perform image analysis and monitoring is referred to as a monitoring area.

Examples of a camera with a large FOV and a shallow DOF include a wide-angle camera. Examples of a camera with a small FOV and a deep DOF include a high-magnification camera and a zoom camera.

The sensor module may be installed in a lighting tower, crane, vessel, etc. in a harbor without any limitation on its location or orientation, and there is no limitation on the number of sensor modules. However, the installation locations or numbers of sensor modules may vary depending on the characteristics such as the types and performances of the sensor modules. For example, a camera may be installed at an altitude of 15 m or higher from the sea level to perform efficient monitoring, or a plurality of cameras may be installed to have different imaging areas. Also, the location and orientation of the sensor module may be adjusted manually or automatically upon or after installation.

Figure 6:
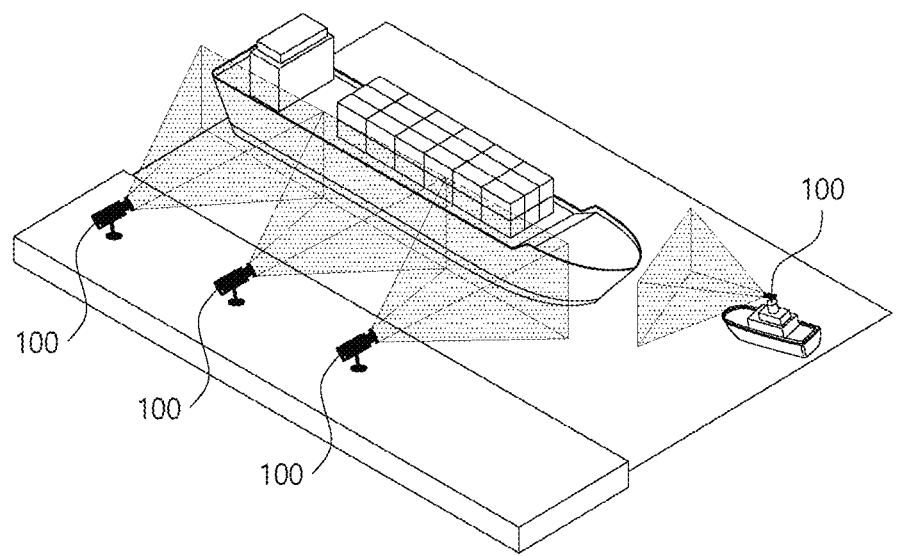
FIGS. 6 and 7 are diagrams related to the installation location of a sensor module according to an embodiment.
Figure 7:
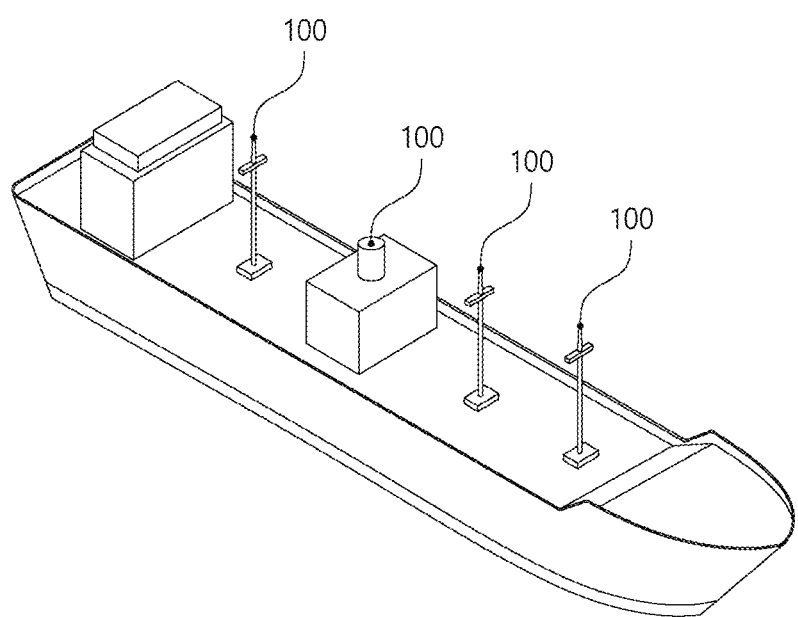

FIGS. 6 and 7 are diagrams related to the installation location of a sensor module according to an embodiment. Referring to FIGS. 6 and 7, a sensor module 100 may be installed at a fixed place such as a harbor or on land or may be installed on a moving object such as a vessel. Here, when the sensor module 100 is installed on a vessel, the sensor module 100 may be installed on a vessel to be monitored (hereinafter referred to as a "target vessel") as shown in FIG. 7 or may be installed on a third-party vessel that is not to be monitored such as a tugboat that supports the berthing or unberthing of a target vessel as shown in FIG. 6. In addition, the sensor module may be installed on a drone or the like to monitor a target vessel.

The other elements of the monitoring device may be installed together with or separately from the sensor module.

As described above, the image analysis for image-based monitoring may include acquiring an object characteristic. Examples of an object may include vessels, harbors, buoys, the sea, topographic features, the sky, buildings, people, animals, fire, and the like. Examples of an object characteristic may include the type of the object, the location of the object, a distance to the object, and the absolute and relative speeds and velocities of the object, and the like.

The image analysis for image-based monitoring may include recognizing/determining a surrounding situation. For example, the image analysis may be for determining that a fire situation has occurred from an image of a fire in a harbor or that an intruder has come in from an image of a person entering a harbor at an unscheduled time.

The image analysis for image-based monitoring may be performed through the control module or the control unit included in each module.

Figure 8:
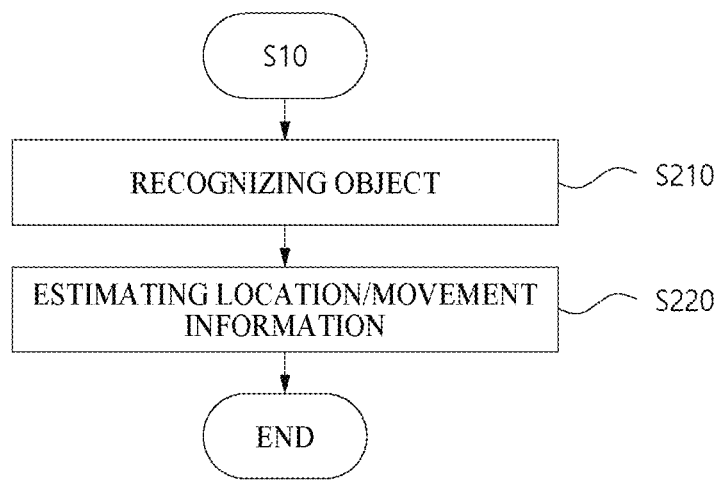
FIG. 8 is a diagram related to image analysis according to an embodiment.

FIG. 8 is a diagram related to image analysis according to an embodiment. Referring to FIG. 8, the image analysis may include an object recognition step S210 and a location/movement information estimation step S220.

The image analysis may include the object recognition step S210. The object recognition step S210 may include recognizing an object included in an image. For example, the object recognition may be for determining whether an object, such as vessels, tugboats, the sea, and harbors, is included in the image. Furthermore, the object recognition may be for determining where the object is in the image.

Figure 9:
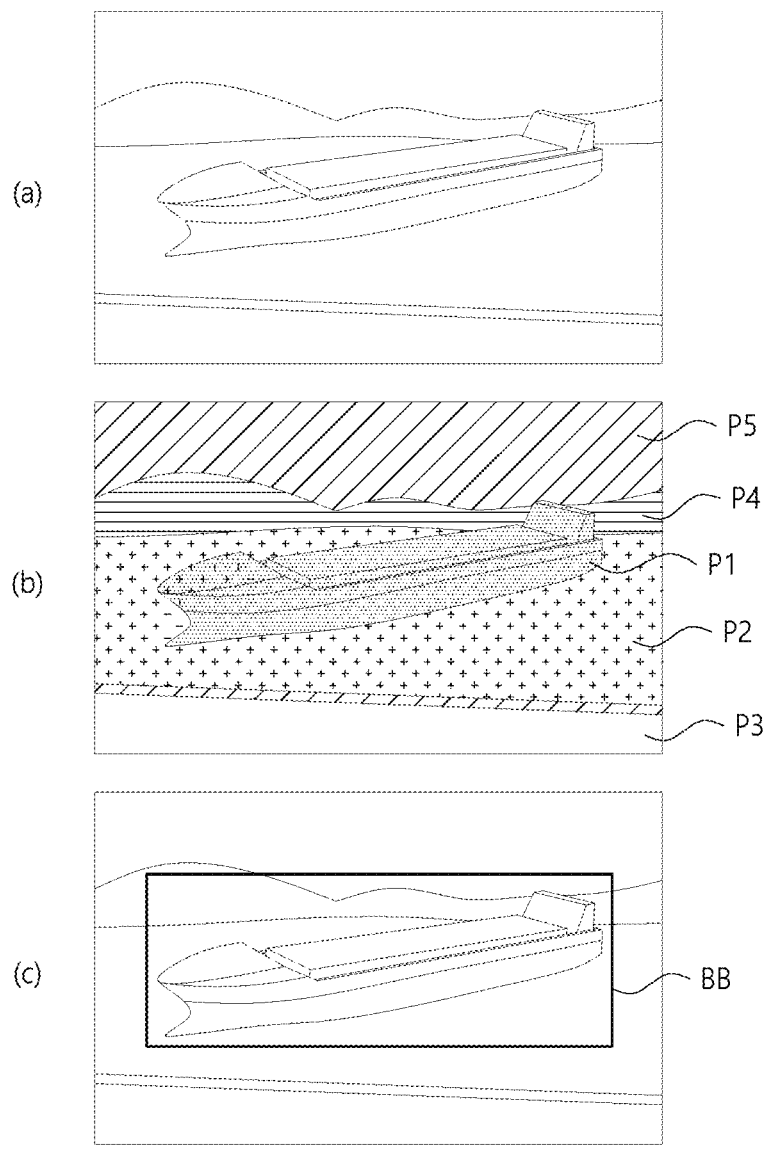
FIG. 9 is a diagram related to an object recognition step according to an embodiment.

FIG. 9 is a diagram showing an object recognition step according to an embodiment. (a) of FIG. 9 shows an image captured by a camera, and an object may be recognized through the object recognition step as shown in (b) or (c) FIG. 9.

In detail, (b) of FIG. 9 shows to which object a corresponding pixel corresponds for each pixel of the image and is also referred to as segmentation. In this case, the object recognition step may refer to a segmentation step. Through the segmentation, characteristics corresponding to pixels of an image may be assigned or calculated based on the image. It could be said that a characteristic is assigned or labeled to a pixel. Referring to (a) and (b) of FIG. 9, segmentation based on the image captured by the camera of (a) of FIG. 9 may be performed to acquire a segmentation image as shown in (b) of FIG. 9. In (b) of FIG. 9, a first pixel area P1 is an area of a pixel corresponding to a vessel in the image, a second pixel area P2 is an area of a pixel corresponding to the sea in the image, a third pixel area P3 is an area of a pixel corresponding to a quay wall of a harbor in the image, a fourth pixel area P4 is an area of a pixel corresponding to a topographic feature in the image, and a fifth pixel area P5 is an area corresponding to the sky in the image.

(b) of FIG. 9 illustrates that information on an object type corresponding to each pixel in the image is calculated by performing segmentation, but information that can be acquired through segmentation is not limited thereto. For example, the characteristics, such as location, coordinates, distance, and direction, of the object may be acquired through segmentation. In this case, different characteristics may be expressed independently or simultaneously reflected.

Table 1 is a table related to labeling that simultaneously reflects information on the types of objects and information on the distances of objects. Referring to Table 1, classes may be set considering the information on the type of objects and the information on the distance of objects, and an identification value may be assigned to each class. For example, a second identification value may be assigned considering a short distance, which is the information on distances of the objects, and a topographic feature, which is the information on types of the objects. Table 1 is an example of a case in which the type information and the distance information are considered together, and other information such as direction information, an obstacle movement direction, velocity, and a sea mark may also be considered. Also, not all identification values should include a plurality of pieces of information and should include the same type of information. For example, a specific identification value may include only the type information (e.g., identification value "1" does not include the distance information), and another identification value may include the type information and the distance information. Depending on the case, it may be expressed in various ways.

TABLE 1

| Identification Value | Class |
| --- | --- |
| 0 | Sky and others |
| 1 | Sea |
| 2 | Topographic Feature + Short Distance |
| 3 | Topographic Feature + Middle Distance |
| 4 | Topographic Feature + Long Distance |
| 5 | Static Obstacle + Short Distance |
| 6 | Static Obstacle + Middle Distance |
| 7 | Static Obstacle + Long Distance |
| 8 | Moving Obstacle + Short Distance |
| 9 | Moving Obstacle + Middle Distance |
| 10 | Moving Obstacle + Long Distance |

(c) of FIG. 9 illustrating where an object is present in the image is shown as a bounding box, which is also referred to as detection. In this case, the object recognition step may refer to a detection step. Compared to the segmentation, the detection may be regarded as detecting where an object is included in the image in the form of a box rather than calculating characteristics for each pixel of the image. Referring to (a) and (c) of FIG. 9, detection based on the image captured by the camera of (a) of FIG. 9 may be performed to acquire a detection image as shown in (c) of FIG. 9. In (c) of FIG. 9, it can be seen that a vessel is detected in the image and the location of the vessel is expressed as a rectangular bounding box (BB). (c) of FIG. 9 shows that only one object is detected, but two or more objects may be detected in one image.

The segmentation and the detection may be performed using an artificial neural network. The segmentation and the detection may be performed through a single artificial neural network. Alternatively, the segmentation and the detection may be performed through each of a plurality of artificial neural networks, and then a final result may be calculated by combining the results.

An artificial neural network is an algorithm modeled after the neural network structure of human brain, and the artificial neural network may include one or more layers including one or more nodes or neurons, and the nodes may be connected through synapses. Data input to the artificial neural network (input data) may be passed through synapses and output through nodes (output data), and information may be obtained accordingly.

The types of artificial neural networks include a convolutional neural network (CNN) which extracts features using a filter and a recurrent neural network (RNN) which has a structure in which an output of a node is fed back as an input, and there are various types of artificial neural networks, such as a restricted Boltzmann machine (RBM), a deep belief network (DBN), a generative adversarial network (GAN), and a relation network (RN), and not limited thereto.

Before using an artificial neural network, it is necessary to train the artificial neural network. Alternatively, it is possible to train an artificial neural network while using another artificial neural network. In the following, a step of training an artificial neural network will be referred to as a training step, and a step of using the artificial neural network will be referred to as an inference step.

The artificial neural network may be trained through various methods such as supervised learning, unsupervised learning, reinforcement learning, and imitation learning.

Figure 10:
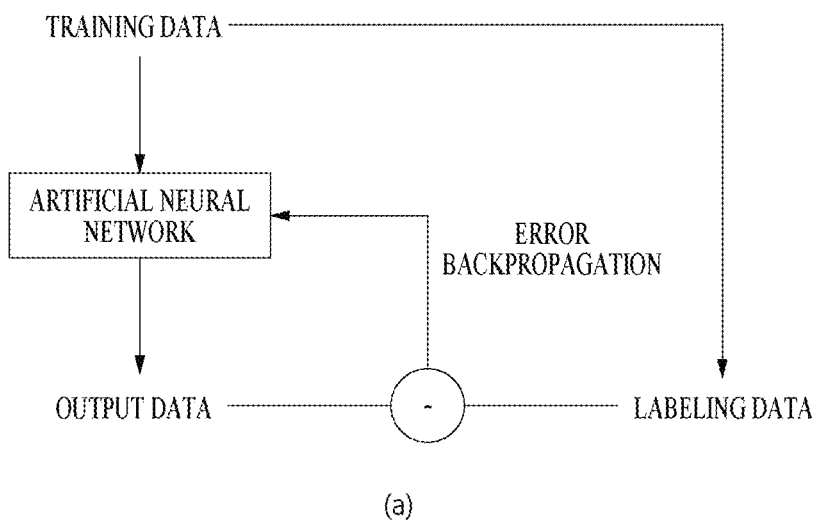
FIG. 10 is a diagram related to a training step and an inference step of an artificial neural network according to an embodiment.
Figure 10:
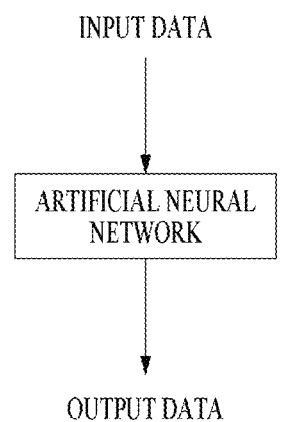

FIG. 10 is a diagram related to a training step and an inference step of an artificial neural network according to an embodiment.

(a) of FIG. 10 is an embodiment of a training step of an artificial neural network. An untrained artificial neural network may receive learning data or training data and transmit output data. Then, the artificial neural network may be trained by comparing the output data to labeling data and back propagating the error. The learning data, the output data, and the labeling data may be images. The labeling data may include ground truth. Alternatively, the labeling data may be data generated through a user or a program.

(b) of FIG. 10 is an exemplary embodiment of an inference step of an artificial neural network, and a trained artificial neural network may receive input data and output output data. Information which is inferable in the inference step may vary according to information of training data in a training step. Also, the accuracy of the output data may vary according to the degree of training of the artificial neural network.

The image analysis may include the location/movement information estimation step S220. The location/movement information estimation step S220 may include estimating information regarding the locations and/or movements of at least some objects recognized in the object recognition step S210. Here, the location information may include an absolute location such as the coordinates of an object, a relative location from a specific reference, a distance (a distance from any point, a distance range, etc.), a direction, and the like, and the movement information may include information related to the movement of the object, such as an absolute velocity, a relative velocity, and a speed.

The location/movement information of the object may be used upon the berthing or unberthing of a vessel. For example, by using a distance from a berth or a quay wall, an approaching velocity based on the distance, a distance and relative velocity from another vessel, and etc. upon the berthing or unberthing of a vessel, it is possible to assist or guide the safe berthing or unberthing of the vessel.

The location/movement information of the object may be used upon the sailing of the vessel. For example, by detecting another vessel or an obstacle near the vessel, warning of a collision using a distance to the vessel or obstacle, a velocity of the vessel or obstacle, etc., or recommending or creating a route, it is possible to assist or guide the safe sailing of the vessel. Alternatively, autonomous sailing may be performed based on such information.

The location/movement information of the object may be calculated based on an image. For example, the location/movement information of the vessel may be calculated based on an image including a vessel, the sea, and the land which are objects. Hereinafter, an object on which the location/movement information is to be estimated is referred to as a target object. For example, in the above example, the vessel may be a target object. Also, there are a plurality of target objects. For example, when the locations, speeds, or the like of a plurality of vessels included in an image are estimated, the plurality of vessels may be target objects.

The location/movement information of the object may be expressed in a plurality of categories with a certain range. For example, the distance information may be expressed as a short distance, a middle distance, a long distance, etc., and the direction information may be expressed as a left direction, a front direction, a right direction, etc. By combining the distance information and the direction information, expressions such as "a short distance to the left" and "a long distance to the right" are possible. The movement information may be expressed as a high speed, a low speed, etc.

The location/movement information of the object may be expressed as an actual distance value, a direction value, a velocity value, and the like. For example, the distance information may be expressed in meters (m), the direction information may be expressed in degrees, and the movement information may be expressed in cm/s.

The location/movement information of the object may be estimated based on an area or a point. As an example, the distance between a vessel and a quay wall may be estimated by calculating the distance between one point of the vessel and one point of the quay wall or may be estimated by calculating the shortest distance between one point of the vessel and the quay wall. As another example, the gap between vessels may be estimated by calculating the distance between one point of the first vessel and one point of the second vessel. One point of the vessel may correspond to one point of the vessel in contact with the sea or to the bow or stern of the vessel, but not limited thereto.

The location/movement information of the object may be estimated based on an image pixel. When the location/movement information is estimated based on a point as described above, a point in the image may correspond to a pixel. Therefore, the location/movement information of the object may be calculated based on the gap between image pixels.

Distance information between points may be calculated based on the gap between pixels. As an example, a certain distance may be assigned to each gap between pixels, and the distance between points may be calculated in proportion to the gap between pixels. As another example, the distance between pixels may be calculated based on a coordinate value of a pixel in the image, and the distance between points may be calculated based on the distance between pixels.

Movement information between points may be calculated based on the change in the distance information between the points. In this case, the movement information may be calculated based on a plurality of images or video frames. For example, movement information between points may be calculated based on the distance between points in the previous frame, the distance between points in the current frame, and a time interval between frames.

Figure 11:
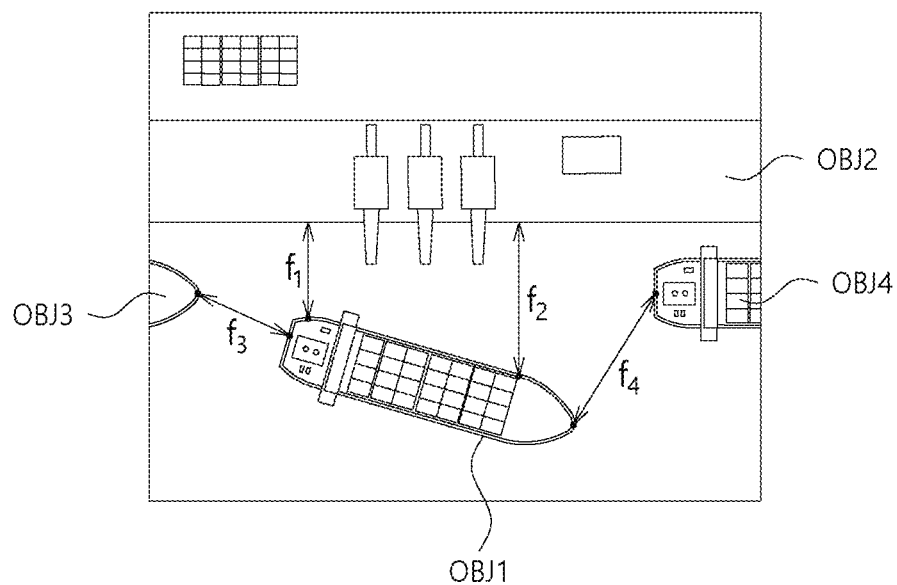
FIGS. 11 and 12 are diagrams related to estimating location/movement information for an object according to an embodiment.
Figure 12:
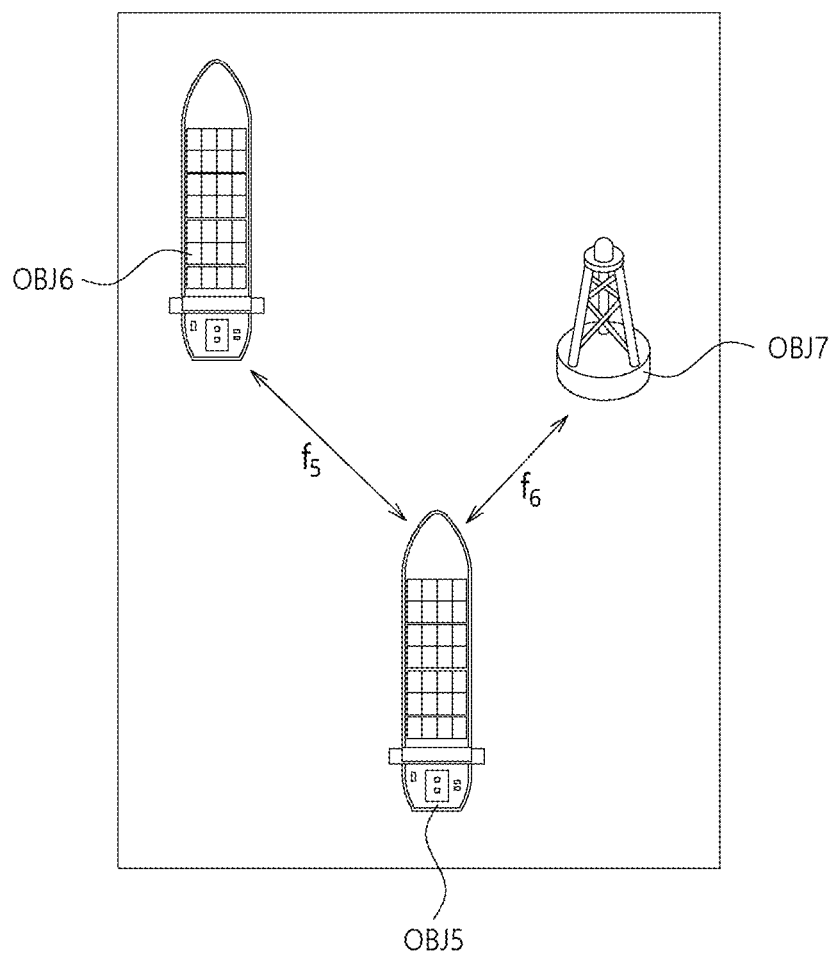

FIGS. 11 and 12 are diagrams related to estimation of location/movement information of an object according to an embodiment.

Referring to FIG. 11, the location/movement information estimation step may include estimating location/movement information $f_1$, $f_2$ with respect to a quay wall OBJ2 or location/movement information $f_3$, $f_4$ with respect to other vessels OBJ3 and OBJ4 upon the berthing or unberthing of a vessel OBJ1. As shown in FIG. 11, the location/movement information $f_1$, $f_2$ between the vessel OBJ1 and the quay wall OBJ2 may be calculated based on two points of the vessel OBJ1. In this case, the two points may correspond to points at which the vessel OBJ1 is in contact with the sea. Also, the distance between the vessel OBJ1 and the quay wall OBJ2 may be the shortest one of the distances between the quay wall OBJ2 and the two points. The location/movement information $f_3$, $f_4$ between the vessel OBJ1 and the other vessels OBJ3 and OBJ4 may be location/movement information between points corresponding to the bows or sterns of the vessels OBJ1, OBJ3, and OBJ4. As described above, when the location/movement information is used to assist or guide the vessel to berth or unberth, the location/movement information may be referred to as berthing guide information or unberthing guide information.

Referring to FIG. 12, the location/movement information estimation step may include estimating location/movement information $f_5$, $f_6$ with respect to an obstacle OBJ7 such as another vessel OBJ6 or a buoy upon the sailing of a vessel OBJ5.

A harbor may be operated or managed based on the data calculated in the location/movement information estimation step. For example, when a vessel collides with a fender, it is possible to predict the replacement timing of the fender by computing the amount of impact from the movement information such as the vessel's velocity.

Embodiments of the image analysis by estimating location/movement information after performing the object recognition step has been described above. Alternatively, the object recognition and the location/movement information estimation may be performed in a single step. For example, it may be possible to recognize an object by performing segmentation or detection and estimate the location/movement information of an object at the same time.

The image-based monitoring may include one or more steps other than the above-described steps.

The image-based monitoring may include a pre-processing step. The pre-processing refers to all kinds of processing performed on an image and may include image normalization, image equalization (histogram equalization), image resizing, upscaling and downscaling in which the resolution or size of an image is changed, cropping, noise removal, or the like. Here, the noise may include fog, rain, water droplets, sea fog (sea clutter), fine dust, direct rays of sunlight, salt, and combinations thereof, and the noise removal may include eliminating or decreasing noise components included in the image.

As an example of the pre-processing, normalization may mean finding the average of RGB values of all pixels of an RGB image and subtracting the average from the RGB image.

Figure 13:
FIG. 13 is a diagram related to defogging according to an embodiment.
Figure 13:
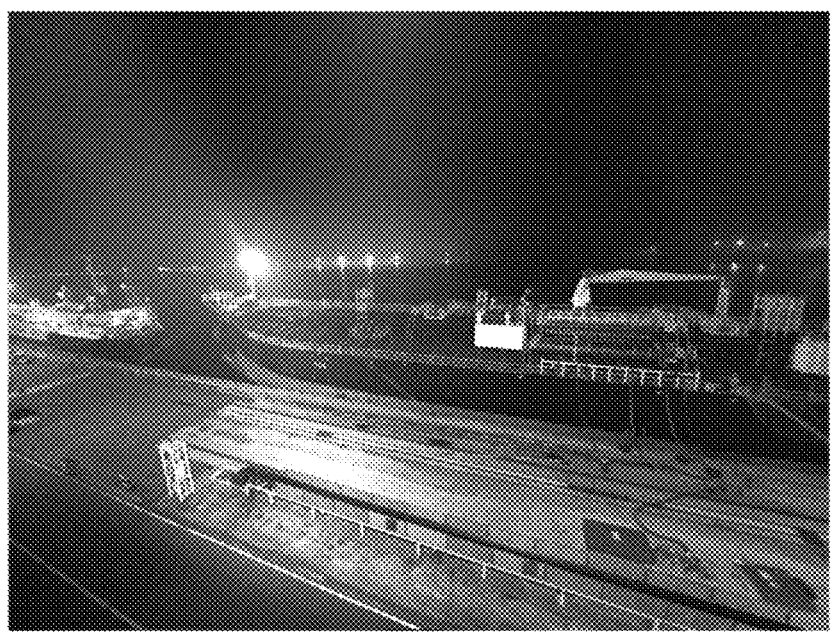

As another example of the pre-processing, defogging may mean transforming an image of a foggy region through the pre-processing so that the image looks like an image of a clear region. FIG. 13 is a diagram related to defogging according to an embodiment. Referring to FIG. 13, through the defogging, an image of a foggy region as shown in (a) of FIG. 13 may be transformed into a defogged image as shown in (b) of FIG. 13.

As still another example of the pre-processing, water droplet removal may mean transforming an image including a water droplet on the front of a camera through the pre-processing so that the image looks like the water droplet has been removed.

Figure 14:
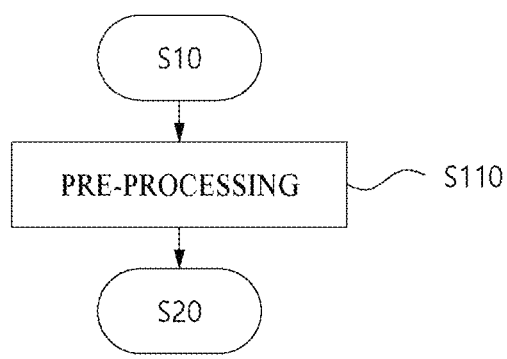
FIG. 14 is a diagram related to a pre-processing step according to an embodiment.

FIG. 14 is a diagram related to a pre-processing step according to an embodiment. Referring to FIG. 14, the image analysis step S20 may be performed after the image obtaining step S10 and then the pre-processing step S110. For example, image analysis may be performed after pre-processing is performed on an image acquired using the image generating unit. Through the image pre-processing, it may be possible to facilitate the image analysis or improve the accuracy.

The image pre-processing may be performed through an artificial neural network. For example, by inputting an image of a foggy region into an artificial neural network, the image may be transformed so that the image looks like an image of a clear region. That is, a denoised image may be acquired by inputting an image including noise into the artificial neural network. Examples of the artificial neural network may include a generative adversarial network (GAN), but not limited thereto.

Alternatively, the image pre-processing may be performed using an image mask. For example, an image of a foggy region may be transformed so that the image looks like an image of a clear region by applying an image mask to the foggy image. Here, examples of the image mask may include a deconvolution filter, a sharpen filter, and the like, and the image mask may be generated through the artificial neural network such as a GAN, but not limited thereto.

A case in which the image analysis is performed after the image is pre-processed has been described above. Alternatively, the image analysis including the pre-processing process may be performed. For example, when the image analysis step includes segmentation or detection, a result of performing segmentation or detection on an image containing noise may be equivalent to a result of performing segmentation or detection of an image containing no noise.

The image-based monitoring may include a step of outputting monitoring information. Information outputted in the monitoring information output step has no limitations as long as the information is information related to the image-based monitoring, i.e., images of a vessel's surroundings, the sea, and a harbor and characteristics, such as types, distances, and velocities, of objects of the images.

The monitoring information may be visually outputted. For example, the monitoring information may be outputted through an output module such as a display.

The monitoring information output step may include displaying an image acquired using the image generation unit in the image obtaining step. In addition, the monitoring information output operation may include displaying various images related to the image-based monitoring, such as an image after the pre-processing step, an image after the segmentation or detection, and an image after the viewpoint transformation, which will be described below.

The monitoring information output step may include displaying location/movement information estimated in the image analysis step.

Figure 15:
FIG. 15 is a diagram related to a monitoring information output step according to an embodiment.

FIG. 15 is a diagram illustrating a monitoring information output step according to an embodiment. Referring to FIG. 15, an image may be displayed together with location/movement information. As shown in FIG. 15, the displayed location/movement information may include the distances and the velocities between a quay wall and the bow and stem of a target vessel, and the gap between a target vessel and another vessel.

The monitoring information output step may include providing information to a user in a manner other than a visual display, i.e., by outputting sound or vibration. For example, a beep may be outputted when there is a risk of the target vessel colliding with the quay wall or other vessels or obstacles, when the velocity of the target vessel approaching the quay wall upon berthing is greater than or equal to a reference velocity, or when the vessel deviates from the route.

The image-based monitoring may include a viewpoint transformation step.

Generally, an image generated by the image generation unit, such as a camera, may appear as a perspective view. Transforming a perspective view into a top view, a side view, and another perspective view may be referred to as viewpoint transformation. It will be appreciated that a top-view image or a side-view image may be transformed into another viewpoint and that the image generation unit may generate a top-view image, a side-view image, or the like. In this case, it may not be necessary to perform the viewpoint transformation.

Figure 16:
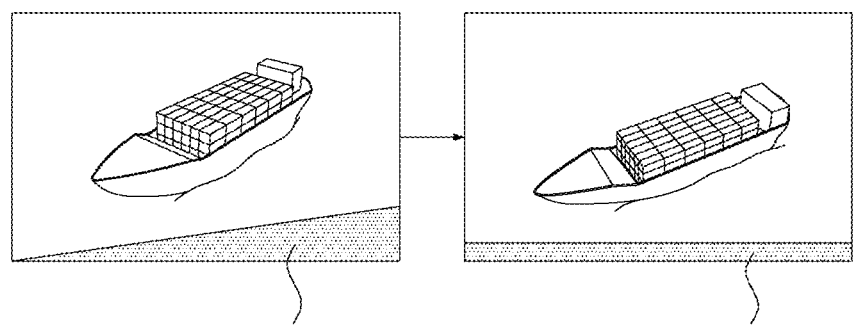
FIG. 16 is a diagram related to viewpoint transformation according to an embodiment.
Figure 16:
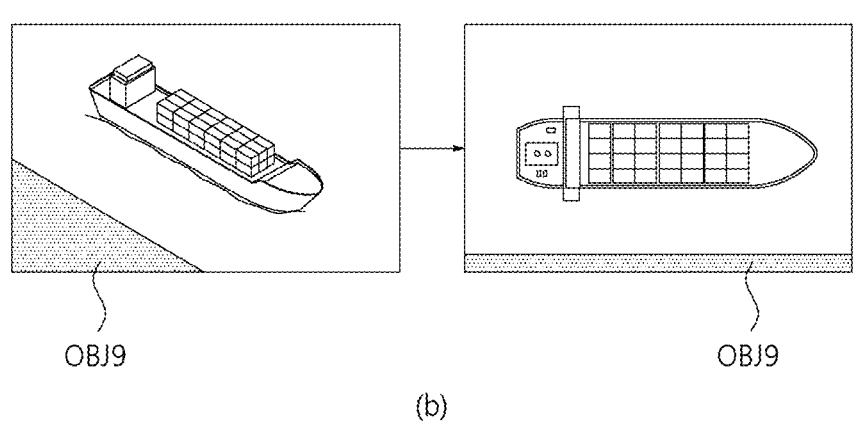

FIG. 16 is a diagram related to viewpoint transformation according to an embodiment. Referring to (a) of FIG. 16, through the viewpoint transformation of a perspective-view image, another perspective-view image may be acquired. Here, the viewpoint transformation may be performed such that the quay wall OBJ8 is horizontally (transversely) located in the image in a horizontal direction. Referring to (b) of FIG. 16, through the viewpoint transformation of a perspective-view image, a top-view image may be acquired. Here, the top-view image may be a view by looking down on the sea vertically from the top. Also, as in (a) of FIG. 16, the viewpoint transformation may be performed so that the quay wall OBJ9 is horizontally located in the image.

After the image is acquired and then the viewpoint transformation is performed, monitoring information may be output by displaying the image to a user. In this case, it may be possible, through the viewpoint transformation, to more easily provide information on the surrounding situation.

Figure 17:
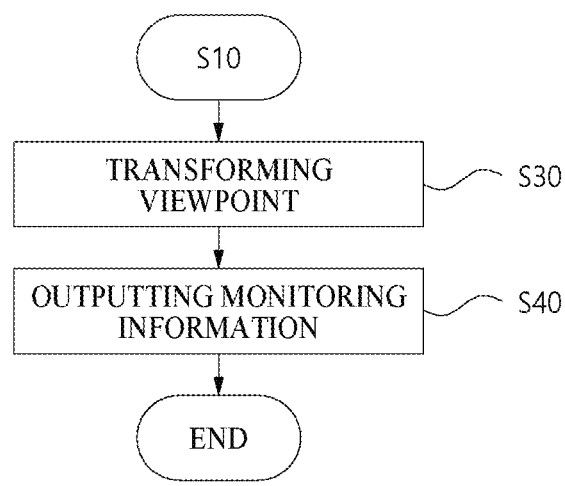
FIG. 17 is a flowchart related to an example of viewpoint transformation according to an embodiment.

FIG. 17 is a flowchart related to an example of viewpoint transformation according to an embodiment. Referring to FIG. 17, after viewpoint transformation is performed, through a viewpoint transformation step S30, on an image acquired in the image obtaining step S10, the image may be displayed to a user in a monitoring information output step S40. Alternatively, after the viewpoint transformation step is performed on an image that is acquired and pre-processed, the image may be displayed to the user.

Figure 18:
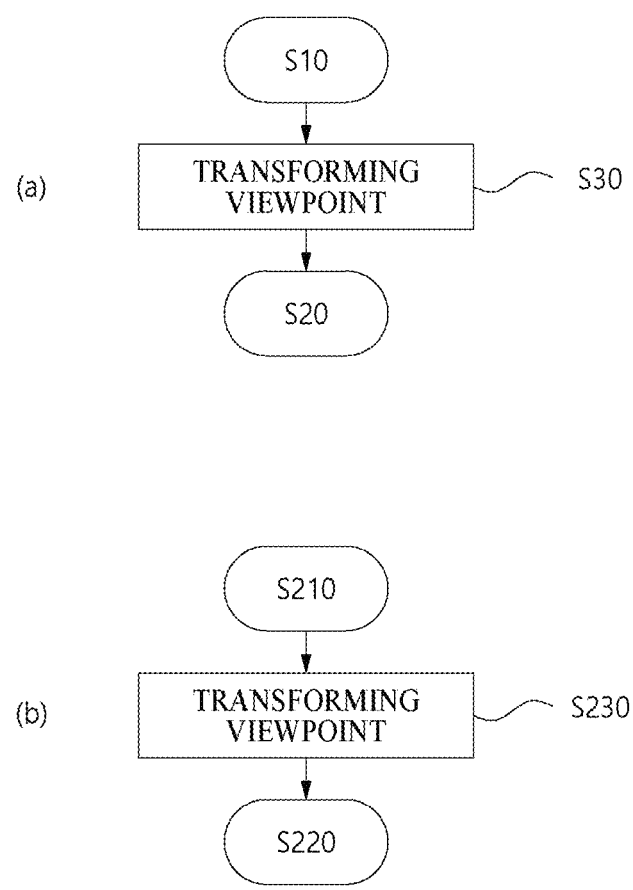
FIG. 18 is a flowchart related to another example of viewpoint transformation according to an embodiment.

After the image is acquired and then the viewpoint transformation is performed, image analysis may be performed. Alternatively, the viewpoint transformation may be performed during the image analysis operation. In this case, it may be possible, through the viewpoint transformation, to improve the ease, convenience, and accuracy of image analysis upon the analysis. For example, when a top-view image is used in the case of pixel-based distance calculation, a distance corresponding to the gap between pixels may be the same in the entirety or at least a portion of the image. FIG. 18 is a flowchart related to another example of viewpoint transformation according to an embodiment. Referring to (a) of FIG. 18, after viewpoint transformation is performed, through the viewpoint transformation step S30, on an image acquired in the image obtaining step S10, the image analysis step S20 may be performed. Referring to (b) of FIG. 18, after viewpoint transformation is performed, through the viewpoint transformation step S230, on an image acquired after the object recognition step S210, the location/movement information estimation step S220 may be performed. For example, when the object recognition step S210 is segmentation, viewpoint transformation is performed on a segmentation image through the viewpoint transformation step S230. Then, the location/movement information estimation step S220 may be performed to calculate location/movement information of an object.

The accuracy of image analysis may vary depending on the selection of a reference plane upon the viewpoint transformation. For example, when a prospective-viewpoint image is transformed into a top-view image, the accuracy of image analysis based on the top-view image may vary depending on the height of the reference plane. In order to accurately calculate the distance between objects at the sea level, it is preferable that the reference plane be sea level upon the viewpoint transformation. Since the height of the sea level may change over time, it is preferable to perform viewpoint transformation considering the height of the sea level to improve the accuracy of image analysis.

As an example of the viewpoint transformation, inverse projective mapping (IPM) may be performed. A two-dimensional (2D) image may be generated by light that is reflected by a subject in a three-dimensional (3D) space and that is incident on an image sensor through a lens of a camera, and the relationship between 2D and 3D depends on the image sensor and the lens, and may be expressed, for example, as shown in Equation 1.

$$s \begin{pmatrix} u \\ v \\ 1 \end{pmatrix} = \begin{pmatrix} f_x & 0 & c_x \\ 0 & f_y & c_y \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} X \\ Y \\ Z \\ 1 \end{pmatrix}$$

[Equation 1]

Here, the matrix on the left side indicates 2D image coordinates, the first matrix on the right side indicates intrinsic parameters, the second matrix indicates external parameters, and the third matrix indicates 3D coordinates. Specifically, $f_x$ and $f_y$ represent focal lengths, cx and cy represent principal points, and r and t represent rotation and translation transformation parameters, respectively.

By projecting a 2D image onto an arbitrary plane in three dimensions through inverse projection transformation, it may be possible to change the viewpoint of the 2D image. For example, through inverse projection transformation, a perspective-viewpoint image may be transformed into a top-view image or another perspective-viewpoint image.

Intrinsic parameters may be required for viewpoint transformation. As an example of a method of finding intrinsic parameters, Zhang's method may be used. Zhang's method, which is a type of polynomial model, is a method of capturing a grid with a known grid size at various angles and distances to acquire intrinsic parameters.

Information on the location and/or orientation of the image generation unit/the sensor module, which has captured images, may be required for viewpoint transformation. Such information may be acquired from the location measurement unit and the orientation measurement unit.

Alternatively, information on the location and/or orientation may be acquired based on the location of a fixture included in the image. For example, at a first time point, the image generation unit may be positioned at a first location and a first orientation to generate a first image including a target fixture, which is a fixed object such as a topographic feature or a building. Subsequently, at a second time point, the image generation unit may generate a second image including the target fixture. A second location and a second orientation, which is the location and/or orientation of the image generation unit at the second time point, may be calculated by comparing the location of the target fixture in the first image and the location of the target fixture in the second image.

Figure 19:
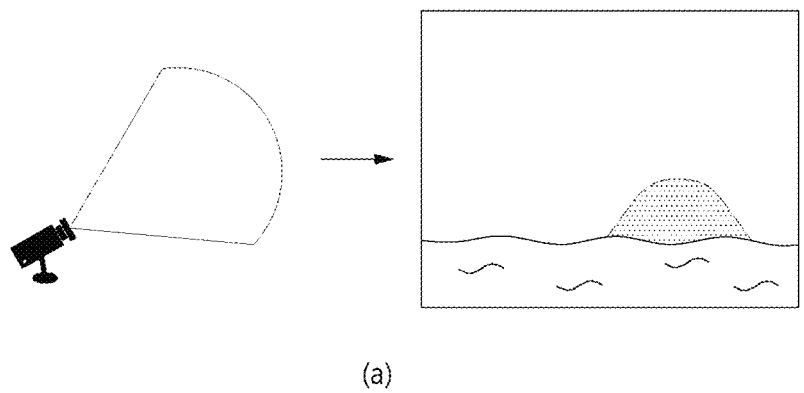
FIG. 19 is a diagram related to the acquisition of information on location and/or orientation using a target fixture according to an embodiment.
Figure 19:
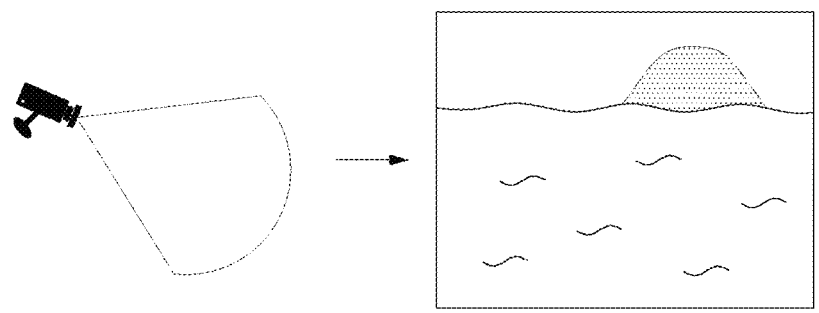

FIG. 19 is a diagram related to the acquisition of information on location and/or orientation using a target fixture according to an embodiment. (a) and (b) of FIG. 19 are diagrams showing a camera of which only the vertical angle is adjusted. (a) of FIG. 19 shows that the camera is positioned upward, and (b) of FIG. 19 shows that the camera is positioned downward. Referring to FIG. 19, the location of an island, which is a target fixture, in an image may vary depending on the angle of the camera. Specifically, it can be seen that the camera is positioned upward when the island is located in a lower portion of the image, and it can be seen that the camera is positioned downward when the island is located in an upper portion of the image. FIG. 19 is shown considering only the vertical angle of the camera, but the same method may be applied when the horizontal angle of the camera is considered and may be applied to other image generation units such as a lidar or a radar rather than a camera.

The acquisition of the information on location and/or orientation for viewpoint transformation may be performed at predetermined time intervals. Here, the time interval may vary depending on the installation location of the image generation unit/the sensor module. For example, when the image generation unit/the sensor module is installed in a moving object such as a vessel, there may be a need to acquire the information on location and/or orientation at short time intervals. On the other hand, when the image generation unit/the sensor module is installed in a fixture such as a harbor, the information on location and/or orientation may be acquired at relatively long time intervals or only once initially. When an object, such as a crane, is repeatedly moved and stopped, the information on location and/or orientation may be acquired only after the movement. Also, the time interval for acquiring the information on location and/or orientation may be changed.

The above-described viewpoint transformation method is for illustrative purposes only, and viewpoint transformation may be performed in a different method. Viewpoint transformation information includes information necessary for the viewpoint transformation, such as the matrix, parameter, coordinates, and location and/or orientation information of Equation 1 above.

The image-based monitoring may include a surveillance step. Here, the surveillance step may mean providing a user with information regarding emergency situations such as a fire and security-related information such as the monitoring of an intruder or an unregistered vessel's access to a harbor.

The intruder monitoring may be performed based on whether a person is included in an image and when an image is captured. For example, when a person is included in a harbor image captured when no operation is in progress at the harbor, it may be determined that an intruder is present.

The vessel monitoring may be performed based on whether a vessel is included in an image. For example, when a vessel that is not registered in an AIS is detected, relevant information may be provided to a user.

The surveillance step may be performed by detecting a person or a vessel based on an image through segmentation or detection.

The image-based monitoring based on a single image has been described above. In addition, the image-based monitoring may be performed based on a plurality of images. When image analysis is performed based on a plurality of images, the total monitoring area of an image-based monitoring device may be increased, or the accuracy of the monitoring may be improved.

Figure 20:
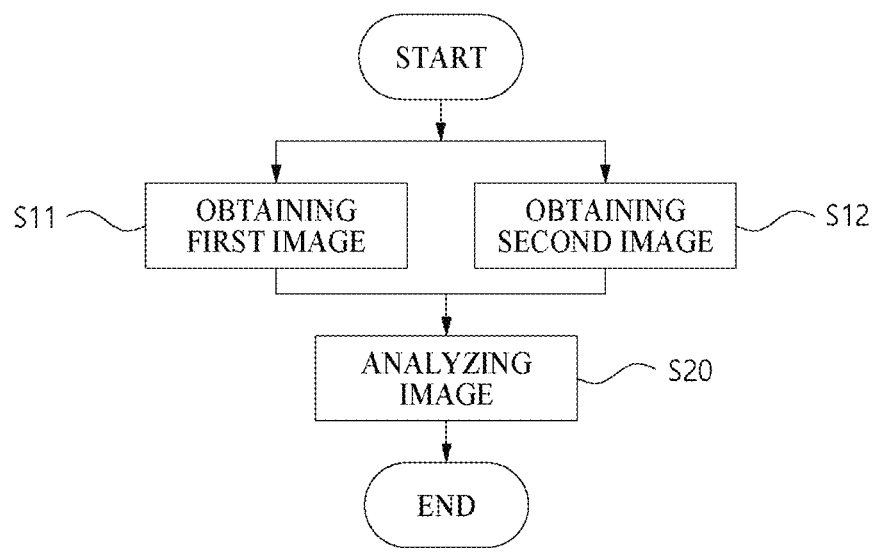
FIG. 20 is a diagram related to image-based monitoring based on a plurality of images according to an embodiment.

FIG. 20 is a diagram related to image-based monitoring based on a plurality of images according to an embodiment. Referring to FIG. 20, an image obtaining step may include a first image obtaining step S11 and a second image obtaining step S12. An image analysis step S20 may include performing image analysis based on a first image acquired in the first image obtaining step S11 and a second image acquired in the second image obtaining step S12.

The image analysis may be performed after a single image is generated based on a plurality of images. For example, a matching image or a fusion image may be generated by matching or fusing the first image and the second image, and image analysis may be performed based on the generated matching image or fusion image.

Alternatively, a final analysis result may be calculated based on a result of performing the image analysis based on each of the plurality of images. For example, first monitoring information may be acquired by performing image analysis on the first image, and second monitoring information may be acquired by performing image analysis on the second image. Then, final monitoring information may be acquired based on the first monitoring information and the second monitoring information.

As an example of the method of acquiring the final monitoring information from a plurality of pieces of monitoring information, there may be a method of calculating final monitoring information by considering a plurality of pieces of monitoring information by weight.

Alternatively, final monitoring information may be calculated based on whether a plurality of pieces of monitoring information do not match each other or whether the difference between the pieces of monitoring information is greater than or equal to a threshold, which is a specific value (hereinafter referred to as whether an error has occurred). For example, based on whether an error has occurred, there may be provided a method of calculating final monitoring information by considering a plurality of pieces of monitoring information by weight, a method of calculating final monitoring information by prioritizing a specific piece among a plurality of pieces of monitoring information, a method of correcting a specific piece of monitoring information with other pieces of monitoring information, a method of ignoring a corresponding piece of monitoring information, etc., but not limited thereto.

The plurality of images may be the same kind of images. For example, when a sensor module including two identical image generation units or two identical sensor modules each including one image generation unit are positioned to perform image-based monitoring, a first image and a second image may be of the same type.

The plurality of images may have different monitoring areas. For example, the first image may be obtained by monitoring a short distance from the image generation unit, and the second image may be obtained by monitoring a long distance from the image generation unit. Alternatively, the first image may be obtained by monitoring the left side of the image generation unit, and the second image may be obtained by monitoring the right side of the image generation unit.

Figure 21:
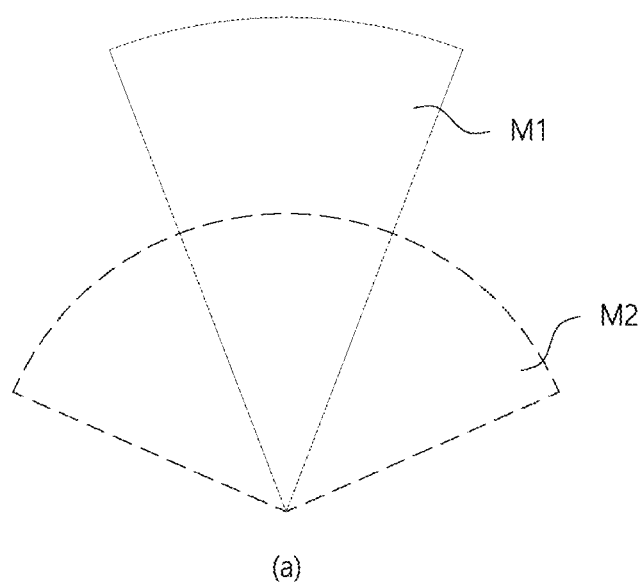
FIG. 21 is a diagram related to a plurality of images having different monitoring areas according to an embodiment.
Figure 21:
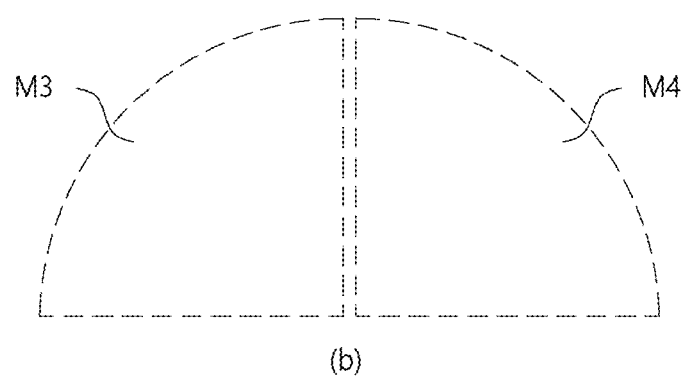

FIG. 21 is a diagram related to a plurality of images having different monitoring areas according to an embodiment. Referring to (a) of FIG. 21, although a plurality of image generation units are positioned in the same direction, the image generation units may have different monitoring areas due to different FOVs and DOFs. Specifically, the monitoring area M1 of the first image may be narrower and wider than the monitoring area M2 of the second image. Referring to (b) of FIG. 21, although the image generation units have the same FOV and DOF, the image generation units may have different monitoring areas due to different orientations. Specifically, the monitoring area M3 of the first image may be on the left side, and the monitoring area M4 of the second image may be on the right side. Also, even in the case of an image generating unit having a narrow FOV, it is possible to monitor a wide FOV by using a plurality of the image generating units.

A single image may be acquired from a plurality of images through image matching. For example, one matching image is generated by matching a first image and a second image, and monitoring such as image analysis or displaying may be performed based on the matching image. There is no limitation on the type of image on which image matching is performed, and the image may include an image captured by an image generation unit, a pre-processed image, a segmentation image, a detection image, an image of which the viewpoint is changed, and the like.

Figure 22:
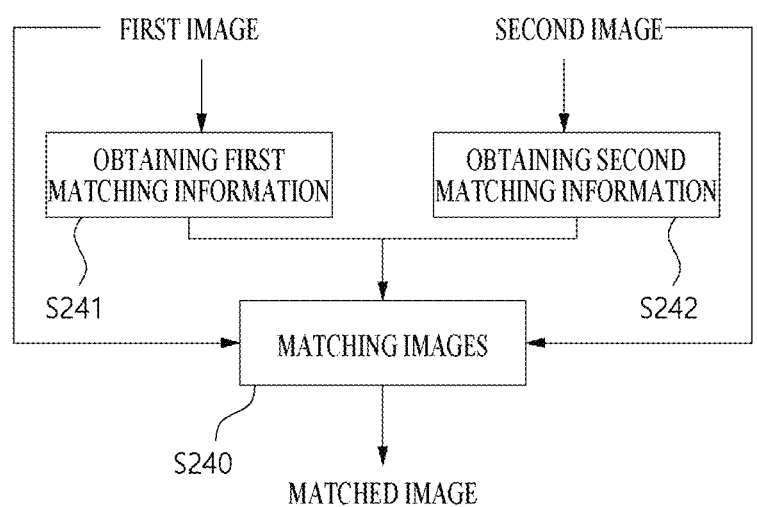
FIGS. 22 and 23 are diagrams related to image matching according to an embodiment.
Figure 23:
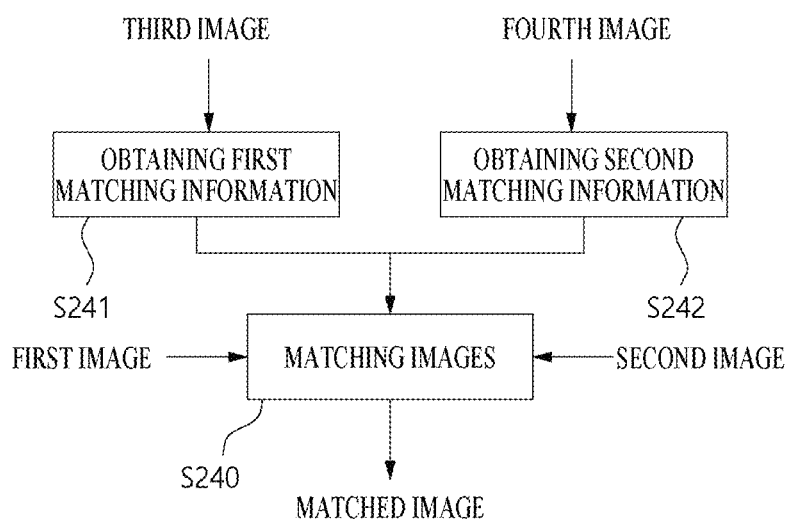

The image matching may be performed based on matching information. The matching information may include any information necessary for image matching. FIGS. 22 and 23 are diagrams related to image matching according to an embodiment.

In order to match a first image and a second image, matching information may be acquired based on the first image and the second image. Referring to FIG. 22, after first matching information and second matching information are acquired from the first image and the second image, respectively, (S241, S242), image matching between the first image and the second image (S240) may be performed based on the first matching information and the second matching information to generate a matching image.

In order to match the first image and the second image, matching information may be acquired based on a third image and a fourth image. Referring to FIG. 23, after first matching information and second matching information are acquired from the third image and the fourth image, respectively, (S241, S242), image matching between the first image and the second image (S240) may be performed based on the first matching information and the second matching information to generate a matching image. In this case, the third image may correspond to the first image, and the fourth image may correspond to the second image. For example, when the first image and the second image are segmentation images, it may be difficult to acquire matching information from the images. Accordingly, the matching information may be acquired from the third image and the fourth image, which are images before the segmentation (e.g., RGB images), and then image matching between the first image and the second image may be performed based on the matching information to generate a matching image.

The image matching may be performed through feature point matching. For example, a matching image may be generated by extracting feature points of the first image and the second image and then matching the extracted feature points. In this case, the matching information may include feature points and information necessary for feature point matching.

A homography matrix may be required for the image matching. In this case, the matching information may include the homography matrix. The term homography refers to matching between any two images on the same plane, and the homography matrix may be expressed as Equation 2.

$$w\begin{pmatrix} x' \\ y' \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix}\begin{pmatrix} x \\ y \\ 1 \end{pmatrix} \quad \text{[Equation 2]}$$

Here, 3×1 matrices on the left side and the right side indicate coordinates of an image, and a 3×3 matrix on the right side indicates the homography matrix. A homography matrix between a plurality of images may be computed, and then image matching may be performed using the homography matrix to generate a matching image.

Figure 24:
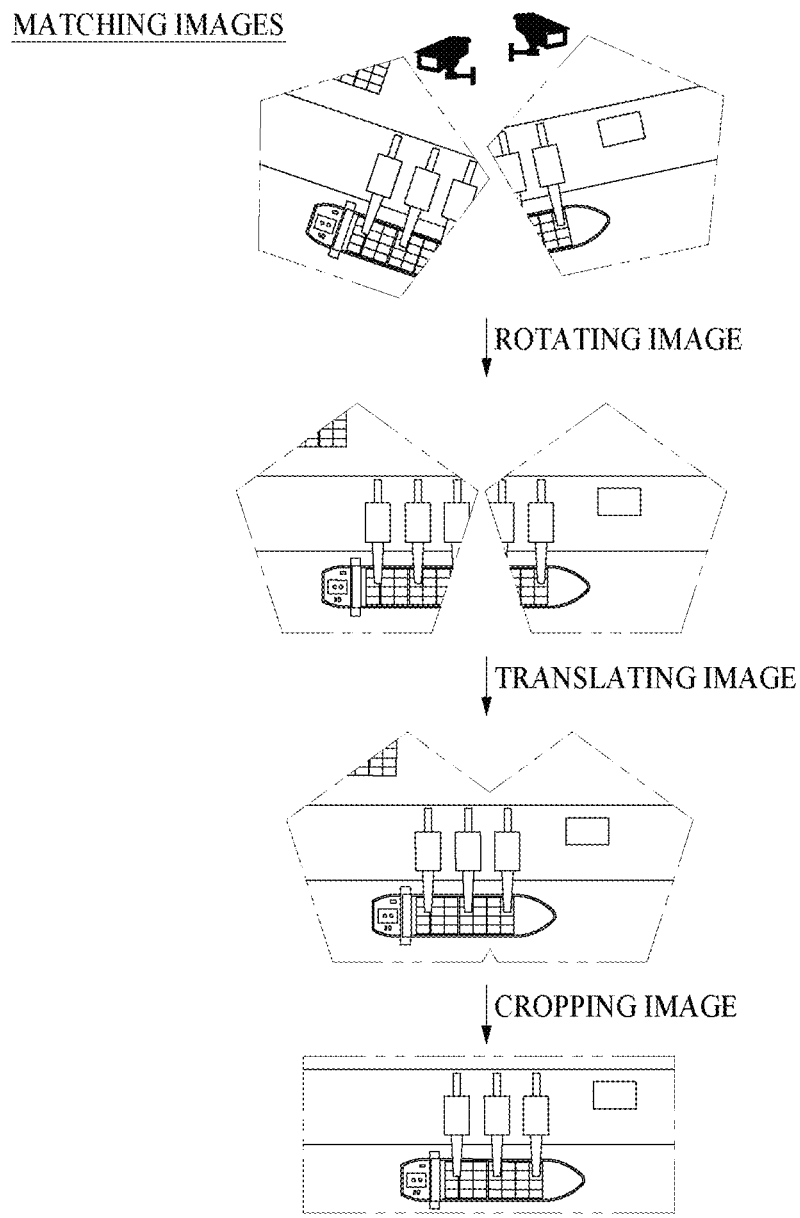
FIG. 24 is a diagram related to image matching according to an embodiment.

FIG. 24 is a diagram illustrating image matching according to an embodiment. Referring to FIG. 24, image matching may be performed by rotating and translating a plurality of images to generate a matching image. In addition, a matching image with a predetermined size may be generated through image cropping.

Image matching may be performed by extracting matching information such as feature point from the entire area of an image. Alternatively, image matching may be performed by extracting matching information from a partial area of an image. In this case, the partial area from which the matching information is extracted may be an area having more matching information than other areas. For example, in the case of an image including a land area and a sea area, matching information may be extracted from the land area to perform the image matching. Specifically, for a first image and a second image each including a land area and a sea area, RGB information may be removed from areas other than the land area (e.g., change all RGV values to 0 or 255), from which the matching information is to be extracted, to generate a first land image and a second land image. Then, matching information may be extracted from the first land image and the second land image, and matching between the first image and the second image may be performed based on the extracted matching information. In this case, the distinction between the land area and the sea area may be performed through image segmentation.

When matching information is extracted using only a partial area of the image, the calculation speed may be increased compared to when matching information is extracted using the entire area.

When matching information is extracted using only a partial area of the image, the accuracy of the image matching may be improved. For example, the land area may have more objects than the sea area, and accordingly, the accuracy of the matching information extracted from the land area may be higher than the accuracy of the matching information extracted from the sea area. Thus, it may be more accurate to extract matching information only from the land area rather than the sea area and perform image matching based on the extracted matching information than to perform image matching including matching information extracted from the sea area.

The above-described image matching is for illustrative purposes only, and image matching may be performed by other methods.

A first image and a second image may be different types of images. For example, when the sensor module includes one RGB camera and one lidar, one of the first image and the second image is an RGB image, and the other is a lidar image. The first image and the second image may be fused to perform image analysis.

Figure 25:
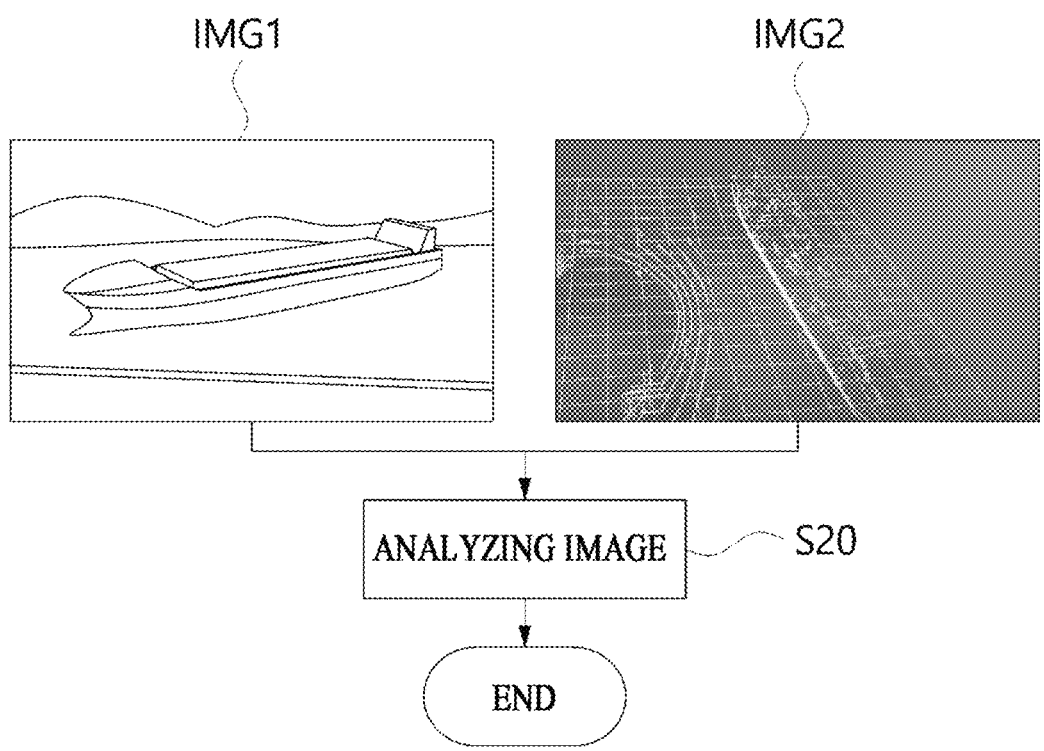
FIG. 25 is a diagram related to image fusion according to an embodiment.

FIG. 25 is a diagram related to image fusion according to an embodiment. Referring to FIG. 25, an RGB image IMG1 and a lidar image IMG2 may be fused to perform image analysis (S20).

When images are fused to perform image analysis, a method of fusing a first image and a second image to generate one fusion image and then performing image analysis to acquire monitoring information (e.g., fusing the RGB image IMG1 and the lidar image IMG2 to generate one fusion image and performing image analysis (S20) based on the fusion image) as described above or a method of performing image analysis on a first image to acquire first monitoring information, performing image analysis on a second image to acquire second monitoring information, and then fusing the first monitoring information and the second monitoring information to acquire final monitoring information (e.g., acquiring first monitoring information through image analysis based on the RGB image IMG1, acquiring second monitoring information through image analysis based on the lidar image IMG2, and then fusing the first monitoring information and the second monitoring information to acquire final monitoring information) may be performed.

Figure 26:
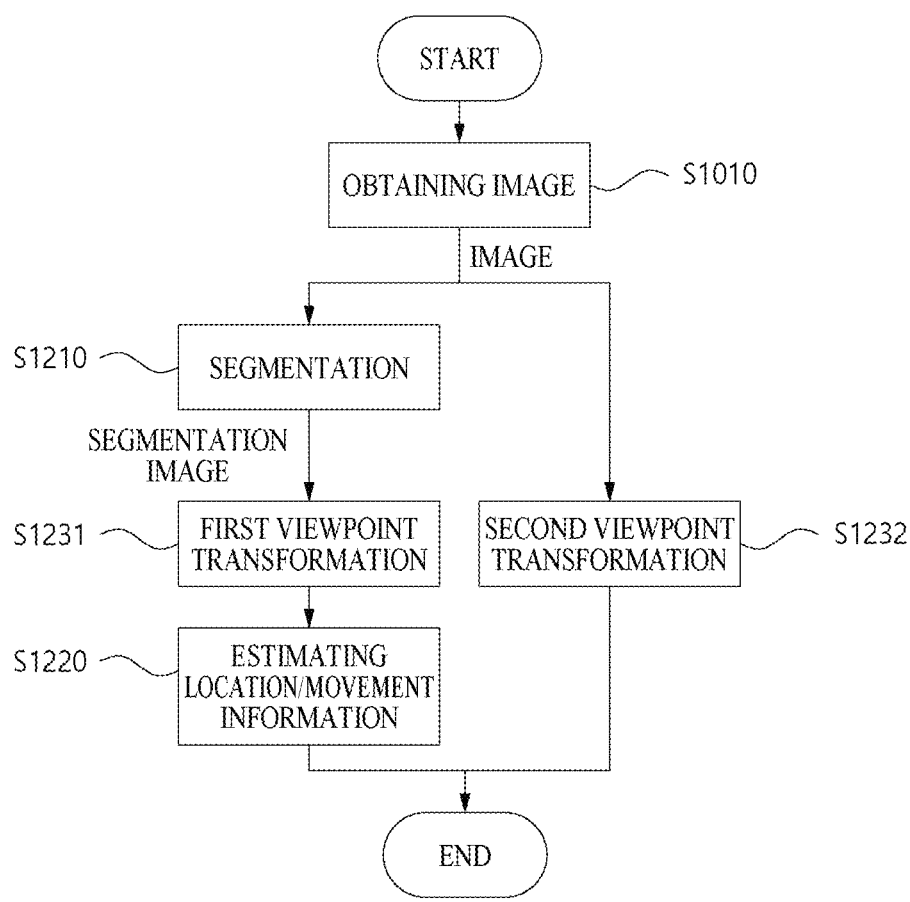
FIGS. 26 and 27 are diagrams related to embodiments of image-based monitoring according to an embodiment.

FIG. 26 is a diagram related to a first embodiment of image-based monitoring according to an embodiment. Referring to FIG. 26, the image-based monitoring may include an image obtaining step S1010, a segmentation step S1210, a first viewpoint transformation step S1231, a second viewpoint transformation step S1232, and a location/movement information estimation step S1220. Each step may be implemented as described here.

An image including an object may be acquired through the image obtaining step S1010. A segmentation image may be acquired by performing the segmentation step S1210 based on the image. The viewpoint of the segmentation image may be transformed through the first viewpoint transformation step S1231, and the viewpoint of the image may be transformed through the second viewpoint transformation step S1232. Here, the segmentation image and the image may be transformed into different viewpoints. For example, the segmentation image may be transformed into a top view, and the image may be transformed into a perspective viewpoint. Location/movement information may be estimated based on the segmentation image of which the viewpoint is transformed (S1220).

Figure 27:
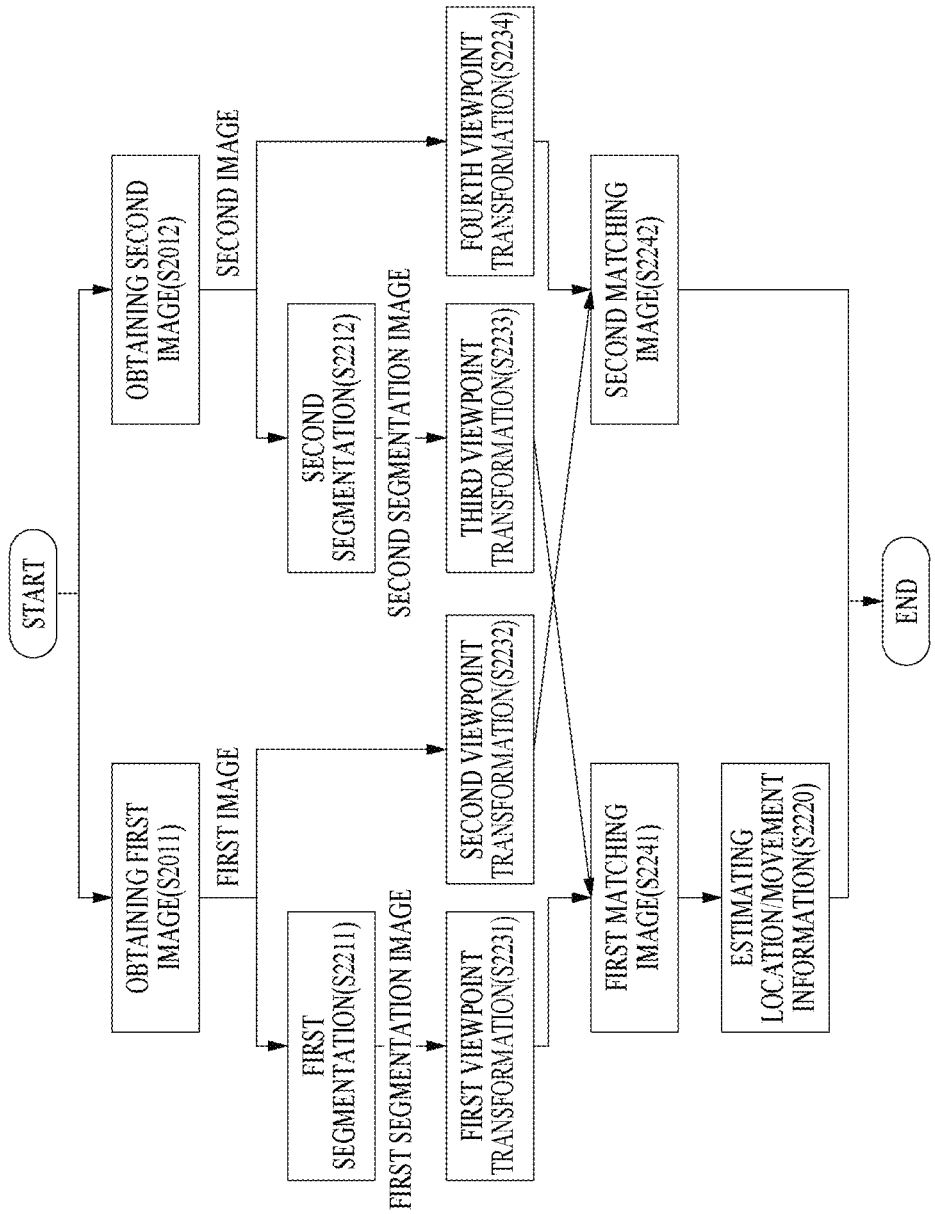

FIG. 27 is a diagram related to a second embodiment of image-based monitoring according to an embodiment. Referring to FIG. 27, the image-based monitoring may include a first image obtaining step S2011 and a second image obtaining step S2012, a first segmentation step S2211 and a second segmentation step S2212, a first viewpoint transformation step S2231, a second viewpoint transformation step S2232, a third viewpoint transformation step S2233, and a fourth viewpoint transformation step S2234, a first image matching step S2241 and a second image matching step S2242, and a location/movement information estimation step S2220. Each step may be implemented as described here.

An image including an object may be acquired through the first image obtaining step S2011 and the second image obtaining step S2012. A first segmentation image may be acquired by performing the first segmentation step S2211 based on a first image, and a second segmentation image may be acquired by performing the second segmentation step S2212 based on a second image. The viewpoint of the first segmentation image may be transformed through the first viewpoint transformation step S2231, and the viewpoint of the second segmentation image may be transformed through the third viewpoint transformation step S2233. Also, the viewpoint of the first image may be transformed through the second viewpoint transformation step S2232, and the viewpoint of the second image may be transformed through the fourth viewpoint transformation step S2234. Here, the first segmentation image and the second segmentation image may be transformed into a viewpoint different from that of the first image and the second image. For example, the first segmentation image and the second segmentation image may be transformed into a top view, and the first image and the second image may be transformed into a perspective viewpoint. The first segmentation image and the second segmentation image of which the viewpoints are transformed may be matched through the first image matching step S2241, and the first image and the second image of which the viewpoints are transformed may be matched through the second image matching step S2242. Location/movement information may be estimated based on the matched segmentation images (S2220).

The embodiments of FIGS. 26 and 27 are for illustrative purposes only, and the image-based monitoring may be performed by other methods.

As an example, some steps may not be performed in the embodiments of FIGS. 26 and 27. Referring to FIG. 26, at least one of the first viewpoint transformation step S1231 or the second viewpoint transformation step S1232 may not be performed. Referring to FIG. 27, at least one selected from the group of the first viewpoint transformation step S2231, the second viewpoint transformation step S2232, the third viewpoint transformation step S2233, and the fourth viewpoint transformation step S2234 may not be performed.

As another example, a step of outputting the estimated location/movement information or a step of performing pre-processing on an image may be added. That is, another step may be added to the embodiments of FIGS. 26 and 27.

As still another example, the segmentation step may be replaced with a detection step. That is, some steps of the embodiments of FIGS. 26 and 27 may be replaced with different steps.

The method according to an embodiment may be implemented in the form of program instructions executable by a variety of computing means and may be recorded on a computer-readable medium. The computer-readable medium may include program instructions, data files, data structures, and the like alone or in combination. The program instructions recorded on the medium may be designed and configured specifically for an embodiment or may be publicly known and available to those skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc.

Examples of the computer instructions include not only machine language code generated by a compiler, but also high-level language code executable by a computer using an interpreter or the like. The hardware device may be configured to operate as one or more software modules in order to perform the operations of an embodiment, and vice versa.

While the elements and features of the present invention have been described with reference to embodiments, the present invention is not limited thereto. It will be obvious to those skilled in the art that various changes or modifications may be made therein without departing from the spirit and scope of the present invention. Accordingly, such changes or modifications are intended to fall within the scope of the appended claims.

As described above, related matters have been described in the best mode for carrying out the invention.

What is claimed is:

1. A method for monitoring surroundings of a vessel performed by one or more processors, the method comprising:
    obtaining an image of a first view, wherein the image represents at least a part of the surroundings of the vessel;
    generating, by using an artificial neural network trained to output information related to a type of an object included in an input image from the input image, a segmentation image of the first view, from the image, including a target region indicating a target object, wherein the target region corresponds to one or more pixels of the image and one or more identification values reflecting a type of the target object are assigned to one or more pixels in the target region corresponding to specific pixels in the segmentation image;
    generating a transformed segmentation image of a second view by transforming a viewpoint of the segmentation image of the first view, wherein the transformed segmentation image includes a transformed target region corresponding to the target region of the segmentation image, and the identification values are assigned to one or more pixels in the transformed target region;
    calculating monitoring information based on a location of the one or more pixels in the transformed target region and the identification values assigned to the one or more pixels in the transformed target region of the transformed segmentation image, wherein the monitoring information includes at least one of a distance between the target object and the vessel or a relative speed of the target object to the vessel; and
    outputting the monitoring information.

2. The method of claim 1,
    wherein the second view is a view overlooking a sea level from a direction perpendicular to the sea level.

3. The method of claim 1,
    generating a display image of a third view by transforming a viewpoint of the image of the first view; and
    outputting the display image.

4. The method of claim 3,
    wherein the image includes a first image and a second image whose monitoring area is at least partially overlapped with the first image,
    wherein the segmentation image includes a first segmentation image and a second segmentation image corresponding to the first image and the second image, respectively, wherein at least one of the first segmentation image or the second segmentation image includes the target region, wherein the display image is generated by matching a first display image and a second display image, wherein the first display image and the second display image corresponds to the first image and the second image, respectively, and wherein the transformed segmentation image is generated by matching a first transformed segmentation image corresponding to the first segmentation image and a second transformed segmentation image corresponding to the second segmentation image, wherein at least one of the first transformed segmentation image or the second transformed segmentation image includes the transformed target region.

5. The method of claim 4, wherein the display image is generated by matching the first display image and the second display image using first matching information, wherein the first matching information is calculated based on a first reference image of the third view and a second reference image of the third view, and wherein the transformed segmentation image is generated by matching the first transformed segmentation image and the second transformed segmentation image using second matching information, wherein the second matching information is calculated based on a third reference image of the second view and a fourth reference image of the second view.

6. The method of claim 5, wherein the first reference image and the second reference image are the first display image and the second display image, respectively, and wherein the third reference image and the fourth reference image are an image generated by transforming a viewpoint of the first image to the second view and an image generated by transforming a viewpoint of the second image to the second view, respectively.

7. The method of claim 1, wherein the image is an image that has been preprocessed on an original image to remove noise included in the original image.

8. The method of claim 1, wherein the method further comprises:

determining a collision risk based on the monitoring information; and outputting the collision risk to a user.

9. A non-transitory computer-readable medium storing a program for executing the method according to claim 1 on a computer.

10. A device for monitoring surroundings of a vessel, the device comprising:

a camera generating an image of a first view, wherein the image represents at least a part of the surroundings of the vessel; and a controller configured to calculate monitoring information, wherein the monitoring information includes at least one of a distance between a target object and the vessel or a relative speed of the target object to the vessel, wherein the controller further configured to:

obtain the image from the camera, generate, by using an artificial neural network trained to output information related to a type of an object included in an input image from the input image, a segmentation image of the first view, from the image, including a target region indicating a target object, wherein the target region corresponds to one or more pixels of the image and one or more identification values reflecting a type of the target object are assigned to one or more pixels in the target region corresponding to specific pixels in the segmentation image, generate a transformed segmentation image of a second view by transforming a viewpoint of the segmentation image of the first view, wherein the transformed segmentation image includes a transformed target region corresponding to the target region of the segmentation image, and the identification values are assigned to one or more pixels in the transformed target region, and calculate the monitoring information based on a location of the one or more pixels in the transformed target region and the identification values assigned to the one or more pixels in the transformed target region of the transformed segmentation image.

11. The device of claim 10, wherein the second view is a view overlooking a sea level from a direction perpendicular to the sea level.

12. The device of claim 10, wherein the controller is further configured to:

generate a display image of a third view by transforming a viewpoint of the image of the first view, and output the display image.

13. The device of claim 12, wherein the image includes a first image and a second image whose monitoring area is at least partially overlapped with the first image, wherein the segmentation image includes a first segmentation image and a second segmentation image corresponding to the first image and the second image, respectively, wherein at least one of the first segmentation image or the second segmentation image includes the target region, wherein the display image is generated by matching a first display image and a second display image, wherein the first display image and the second display image corresponds to the first image and the second image, respectively, and wherein the transformed segmentation image is generated by matching a first transformed segmentation image corresponding to the first segmentation image and a second transformed segmentation image corresponding to the second segmentation image, wherein at least one of the first transformed segmentation image or the second transformed segmentation image includes the transformed target region.

14. The device of claim 13, wherein the display image is generated by matching the first display image and the second display image using first matching information, wherein the first matching information is calculated based on a first reference image of the third view and a second reference image of the third view, and wherein the transformed segmentation image is generated by matching the first transformed segmentation image and the second transformed segmentation image using second matching information, wherein the second matching information is calculated based on a third reference image of the second view and a fourth reference image of the second view.

15. The device of claim 14, wherein the first reference image and the second reference image are the first display image and the second display image, respectively, and wherein the third reference image and the fourth reference image are an image generated by transforming a viewpoint of the first image to the second view and an image generated by transforming a viewpoint of the second image to the second view, respectively.

16. The device of claim 10,
wherein the image is an image that has been preprocessed on an original image to remove noise included in the original image.

* * * * *